(12) United States Patent  (10) Patent No.: US 7,562,925 B2
Henderson et al.  (45) Date of Patent: Jul. 21, 2009

(54) VEHICLE SIDE ARTICLE TRANSPORTER DEVICE

(75) Inventors: Jack Vernon Henderson, Rochester Hills, MI (US); Peter Vincent MacLean, Clinton Township, MI (US)

(73) Assignee: Magna International (CA)

( * ) Notice: Subject to any disclaimer, the term of this patent is extended or adjusted under 35 U.S.C. 154(b) by 0 days.

(21) Appl. No.: 12/229,228

(22) Filed: Aug. 21, 2008

(65) Prior Publication Data

US 2008/0309108 A1 Dec. 18, 2008

Related U.S. Application Data

(62) Division of application No. 11/648,969, filed on Jan. 3, 2007, now Pat. No. 7,431,368.

(51) Int. Cl.
*B60N 3/12* (2006.01)
(52) U.S. Cl. .................................................. 296/37.6
(58) Field of Classification Search ............... 296/37.6, 296/37.1; 224/326, 400
See application file for complete search history.

(56) References Cited

U.S. PATENT DOCUMENTS

| | | | | |
|---|---|---|---|---|
| 2,455,417 A | * | 12/1948 | Holan et al. | 296/37.6 |
| 2,722,352 A | * | 11/1955 | Dehnel | 296/37.6 |
| 2,772,913 A | * | 12/1956 | Howard et al. | 296/186.4 |
| 3,245,713 A | | 4/1966 | Ogilvie | |
| 3,326,595 A | | 6/1967 | Ogilvie | |
| 4,135,761 A | | 1/1979 | Ward | |
| 4,705,317 A | * | 11/1987 | Henri | 296/37.6 |
| 4,789,195 A | | 12/1988 | Fletcher | |
| 5,368,357 A | * | 11/1994 | Kalis et al. | 296/37.6 |
| 5,979,973 A | | 11/1999 | Clare | |
| 5,992,719 A | | 11/1999 | Carter, III | |
| 6,003,923 A | | 12/1999 | Scott et al. | |
| 6,012,754 A | | 1/2000 | Clare et al. | |
| 6,030,018 A | * | 2/2000 | Clare et al. | 296/37.6 |
| 6,059,341 A | * | 5/2000 | Jensen et al. | 296/37.6 |
| 6,129,401 A | | 10/2000 | Neag et al. | |
| 6,142,549 A | * | 11/2000 | Clare et al. | 296/37.6 |
| 6,237,211 B1 | * | 5/2001 | Clare et al. | 296/37.6 |
| 6,439,634 B1 | * | 8/2002 | Jensen et al. | 296/37.6 |
| 6,464,276 B1 | * | 10/2002 | Gruich | 296/37.6 |
| 6,485,077 B1 | * | 11/2002 | Foster et al. | 296/37.6 |
| 6,814,397 B2 | | 11/2004 | Henderson et al. | |
| 6,966,593 B2 | | 11/2005 | Plentis et al. | |
| 7,048,320 B2 | | 5/2006 | Rubel et al. | |
| 7,052,067 B2 | | 5/2006 | Walker | |
| 7,431,368 B2 | | 10/2008 | Henderson et al. | |

* cited by examiner

*Primary Examiner*—Kiran B. Patel
(74) *Attorney, Agent, or Firm*—Warn Partners, P.C.; Marc Luddy

(57) ABSTRACT

The present invention is a container for a light-duty automobile such as a light-duty pickup truck or sport-utility vehicle having at least one opening, operably associated with the quarter panel of an automobile, an inner wall operably associated with the container, and a cover having a closed position and an open position operably associated with the opening. The cover includes a door inner, and a door outer. The invention also includes a first rail positioned between the container and the quarter panel. The container is integrally formed with the first rail, and is located between the first rail and the inner wall. The first rail supports the container, and the cover can be moved from the open position to the closed position, allowing access to the container.

3 Claims, 23 Drawing Sheets

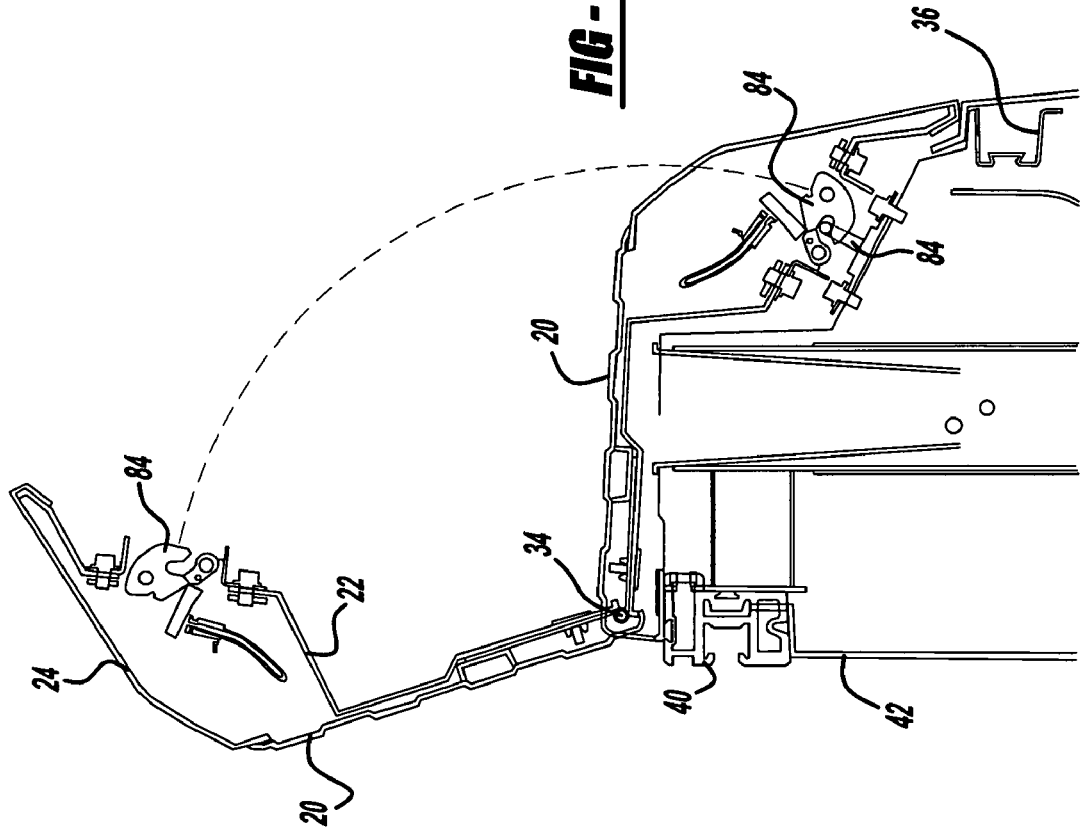
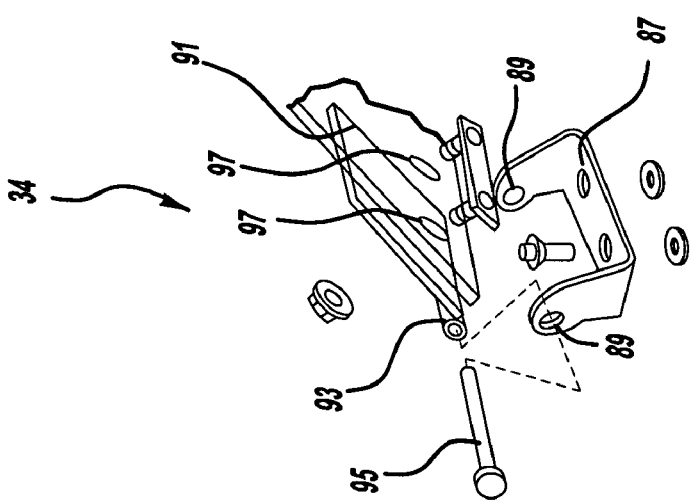

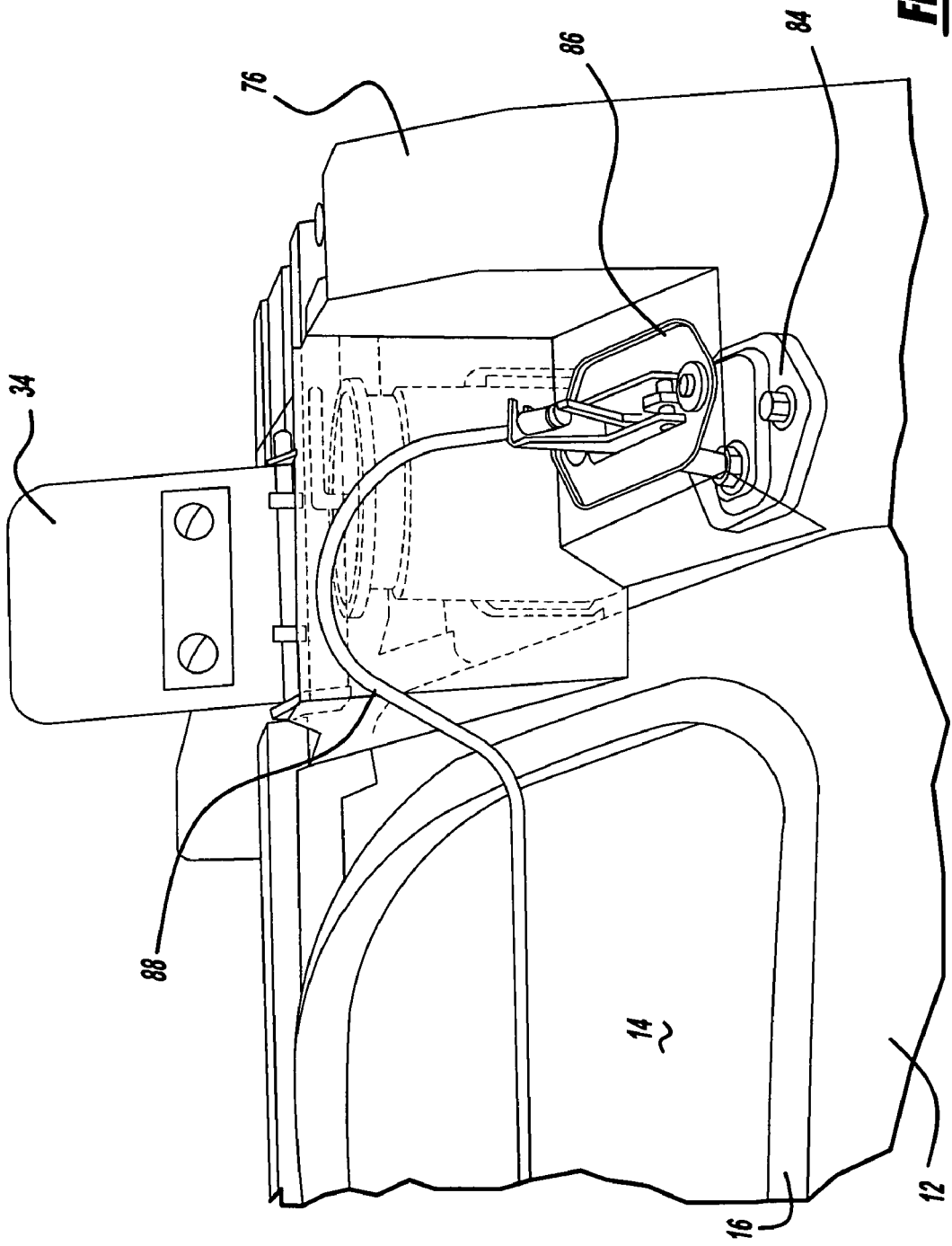

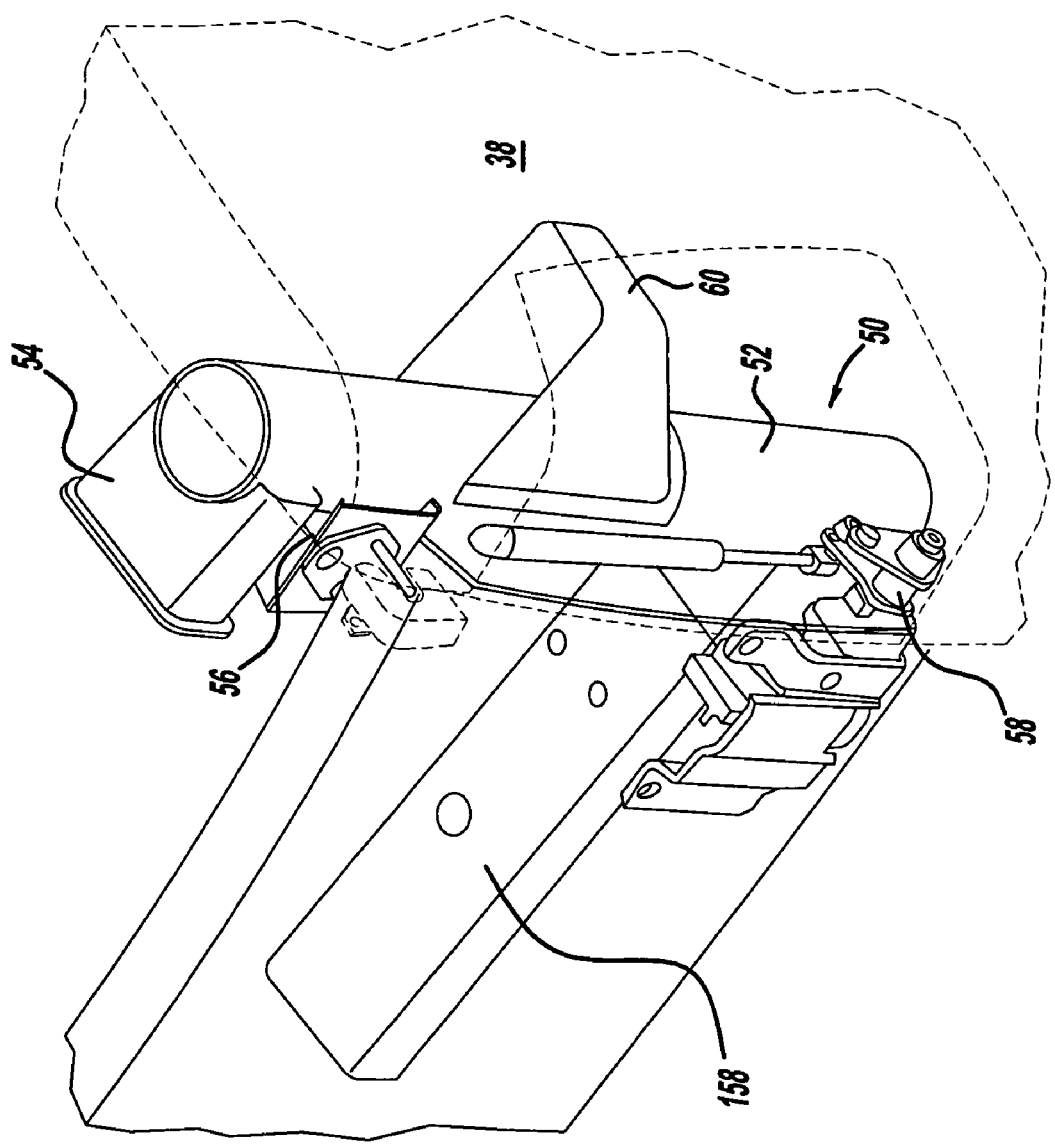

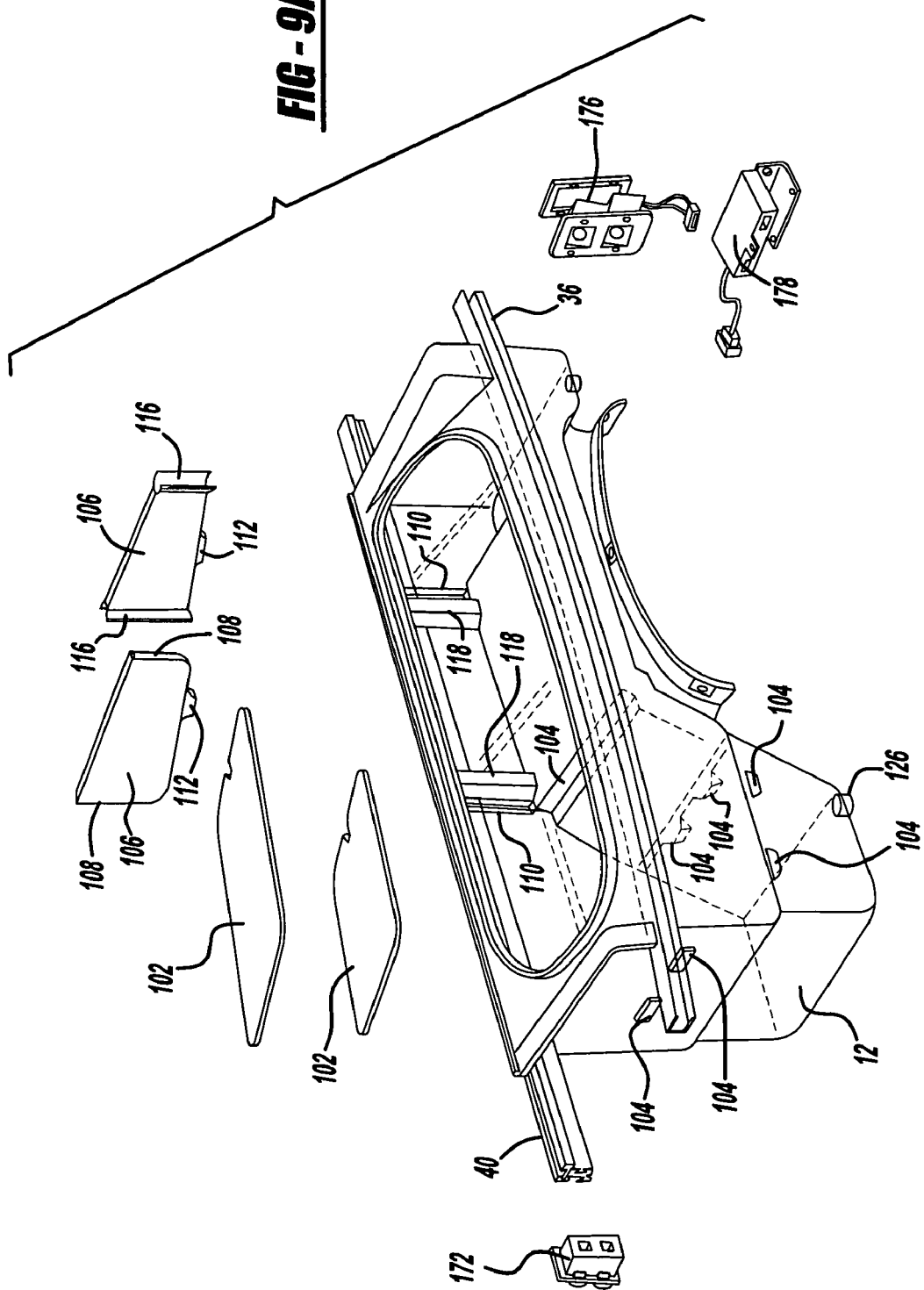

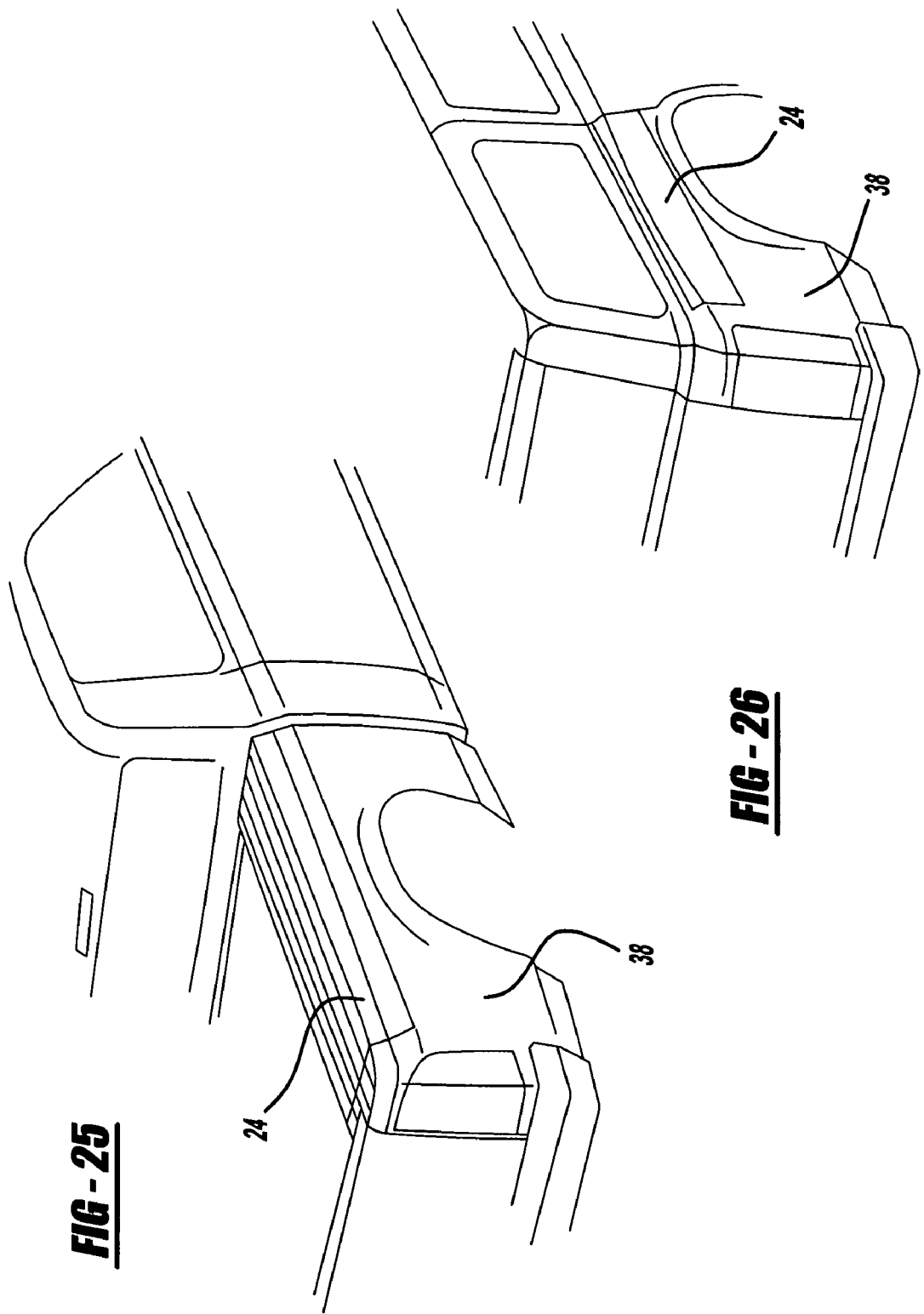

US 7,562,925 B2

VEHICLE SIDE ARTICLE TRANSPORTER DEVICE

CROSS-REFERENCE TO RELATED APPLICATIONS

This application is a divisional of U.S. patent application Ser. No. 11/648,969 filed on Jan. 3, 2007. The disclosure of the above application is incorporated herein by reference.

FIELD OF THE INVENTION

The present invention relates to a formed storage unit for use in light duty pickup trucks and sport-utility vehicles.

BACKGROUND OF THE INVENTION

Pickup trucks and sport utility vehicles often have space between the inner and outer panels of the body (or bed in the case of a pickup truck) which is typically unused or underutilized. The space is most prevalent around the area of the wheel house enclosures of both pickup trucks and sport utility vehicles. It is often desired to store and transport smaller items, where the large space in the bed of a pickup or the back of a sport utility vehicle is unnecessary. Typically, to transport smaller items, a toolbox or other type of storage device is placed in the pickup bed or the back of the sport utility vehicle. Having an additional tool box or other type of storage device placed in the bed or the back of a sport utility vehicle reduces the amount of space available for transporting larger items.

Accordingly, there exists a need for a storage unit which is capable of storing and moving articles of interest to the majority of light duty truck and sport utility vehicle owners that allows for the enclosed, weather resistant, lockable moving or carrying of articles, while still maintaining the essence of the vehicle's original intent.

SUMMARY OF THE INVENTION

The present invention is a container for a light-duty automobile such as a light-duty pickup truck or sport-utility vehicle having at least one opening, operably associated with the quarter panel of an automobile, an inner wall operably associated with the container, and a cover having a closed position and an open position operably associated with the opening. The cover includes a door inner, and a door outer. The invention also includes a first rail positioned between the container and the quarter panel.

The container is integrally formed with the first rail, and is located between the first rail and the inner wall. The first rail supports the container, and the cover can be moved from the open position to the closed position, allowing access to the container.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4A is a second sectional side view of a vehicle side article transporter device, according to the present invention;

FIG. 4B is an exploded view of a hinge used for the cover of a vehicle side article transporter device, according to the present invention;

FIG. 5 is a perspective view of a hinge and a door latch used for a front extension of a vehicle side article transporter device, according to the present invention;

FIG. 6 is a perspective view of a first embodiment of a corner support used in a vehicle side article transporter device, according to the present invention;

FIG. 9A is an exploded view of a container having horizontal and cross-car dividers used in a vehicle side article transporter device, according to the present invention;

FIG. 25 is a perspective view of a vehicle side article transporter device used in a pick-up truck, according to the present invention; and FIG. 26 is a perspective view of a vehicle side article transporter device used in a sport-utility vehicle, according to the present invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
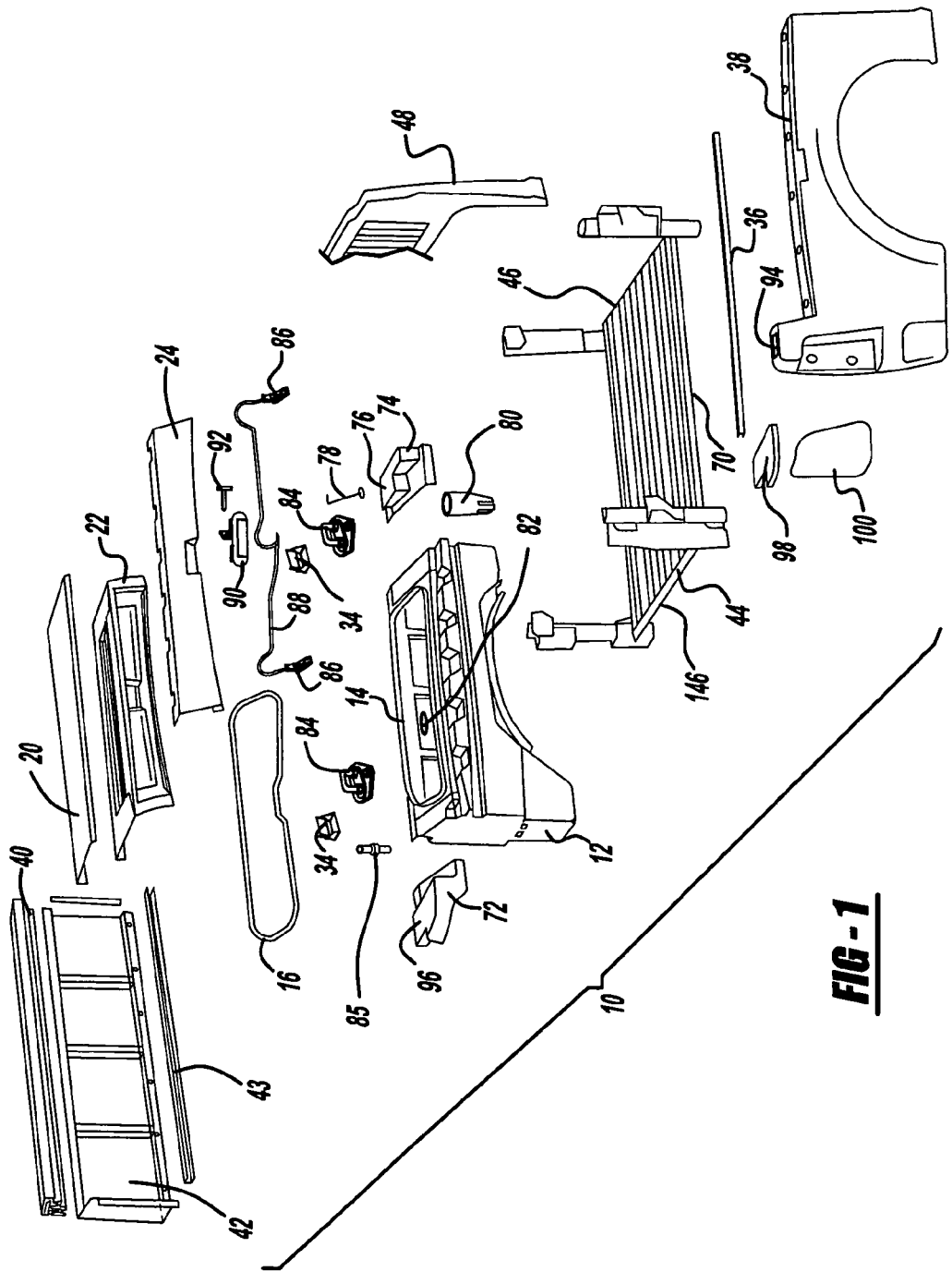
FIG. 1 is a first exploded view of a vehicle side article transporter device, according to the present invention.
Figure 2:
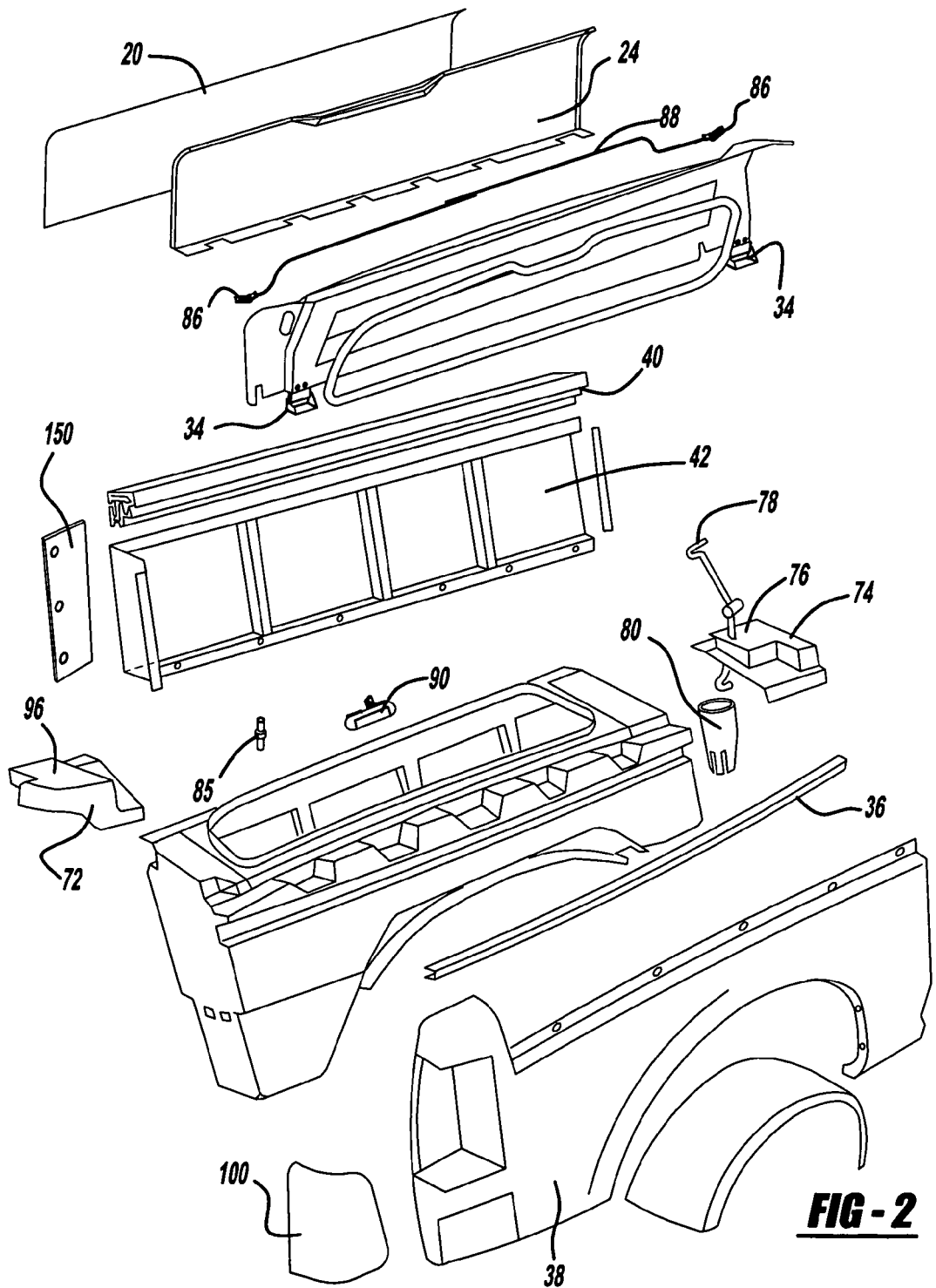
FIG. 2 is a second exploded view of a vehicle side article transporter device, according to the present invention.

An exploded view of a vehicle side article transport device according to the present invention is shown in FIGS. 1 and 2, generally at 10. The transport device 10 has a container 12, which is made through a forming process such as blow molding. The container 12 has an opening 14 in which objects to be stored are inserted. Surrounding the opening 14 is a seal 16, the function of which will be described later.

Figure 3:
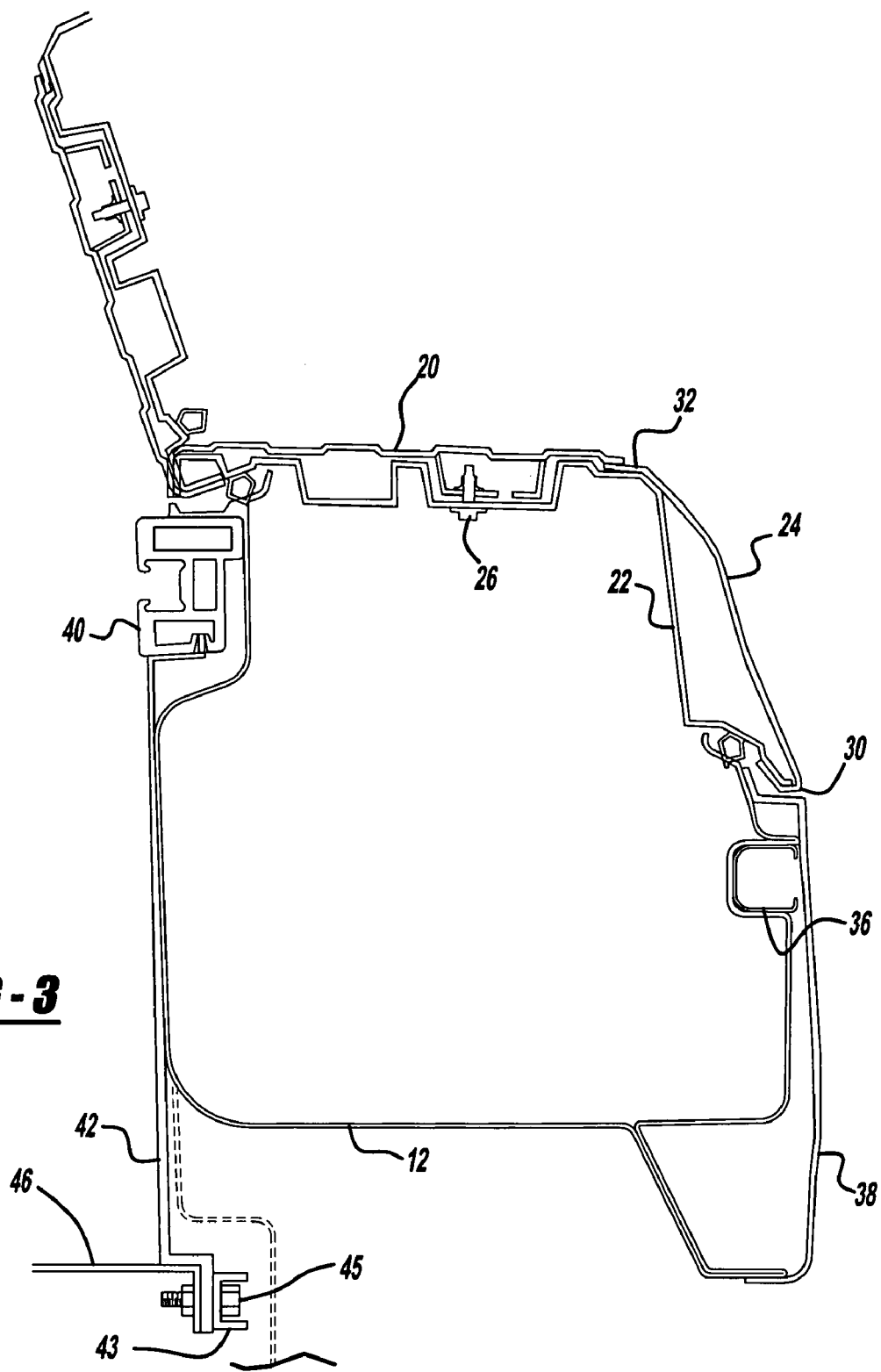
FIG. 3 is a first sectional side view of a vehicle side article transporter device, according to the present invention.

The container 12 also includes a cover 18 which has a door outer 20, a door inner 22, and a door appliqué 24. The door outer 20 is connected to the door inner 22 through the use of attaching screws 26. There are eight attaching screws 26 used to connect the door outer 20 to the door inner 22, however, the number of attaching screws 26 may be changed to suit derivations of the present invention. The door inner 22 also has a lip 28 which is inserted into a recess 30 in the door appliqué 24. The door appliqué 24 also extends in between the door inner 22 and the door outer 20 as shown in FIG. 3. The portion of the door appliqué 24 which extends in between the door inner 22 and the door outer 20 has sections 32 that protrude out of the door appliqué 24 and are attached to the door inner 22 through the use of a set of screws (not shown). The force applied to the door appliqué 24 extending in between the door inner 22 and the door outer 20 along with the lip 28 being inserted into the recess 30 holds the door appliqué 24 in place. The cover 18 is connected to the container through the use of a set of hinges 34.

The door appliqué 24 is not a necessary component of the transporter device 10; the transporter device 10 can function as desired without the door appliqué 24. The purpose of the door appliqué 24 is to provide a surface having high-gloss paint, or high quality finish, which can be matched to the surface of a vehicle having a high quality finish. Vehicles incorporating the present invention which are used for commercial purposes, such as construction or electrical work, may not need the door appliqué 24 because the aesthetic appearance of the vehicle may not be relevant.

The container 12 is supported by first rail or outer rail 36, which is positioned in between the container 12 and a quarter panel 38 of a pickup truck or a sport utility vehicle, and a second rail or inner upper rail 40, which is located between the container 12 and an inner wall 42 of the bed of a pick up truck or the interior of a sport utility vehicle. The container 12 is made through the use of a forming process, such as blow molding, injection molding, or vacuum molding, and is molded around the outer rail 36, and the inner upper rail 40.

When the container 12 is assembled into the bed of a pickup truck or rear section of a sport utility vehicle, in this embodiment the container 12 is located on the outside of and supported by a structural bed assembly 44. The structural bed assembly 44 has a flat panel 46 used for transporting various items in known fashion. Also included as part of the structural bed assembly 44 is a header panel 48; the header panel 48, the flat panel 46, and the inner wall 42 form the bed of a pick up truck. As shown in FIGS. 1 and 3, a lower rail 43 is connected to the panel 46 and inner wall 42 through the use of a fastener 45. Similar components are used to form the rear portion of a sport utility vehicle which also incorporates the transporter device 10 of the present invention.

Included in the structural bed assembly 44 are four corner supports 50. The corner supports 50 are shown in more detail in FIG. 6. The corner supports 50 include a center post 52, a first side bracket 54, a second side bracket 56, a third side bracket 58, and an outer bracket 60. Connected to the corner supports 50 are the load absorbing members, which in this embodiment are shocks 146 used for raising and lowering the tailgate (not shown) of the pickup truck or sport utility vehicle. The load absorbing members could also be gas struts as well.

When the container 12 is attached to the structural bed assembly 44, the inner upper rail 40 used for supporting the container 12 is supported by a ledge 62 on the inner wall 42, and the first side bracket 54 of the corner support 50. The outer rail 36 is connected to and supported by the outer bracket 60. It should be noted that other embodiments of the present invention for use in a pickup truck may include welding the outer rail 36 and the and the inner upper rail 40 directly to the header panel 48, which would eliminate the need for two of the corner supports 50. Embodiments of the present invention used in a sport utility vehicle may incorporate attaching the inner upper rail 40 and the outer rail 36 directly to a common C-pillar. Additionally, the first side bracket 54 and outer bracket 60 could also be connected to the header panel 48 or a C-pillar for supporting the inner upper rail 40 and the outer rail 36, respectively, which would eliminate two of the corner posts 52.

Figure 7:
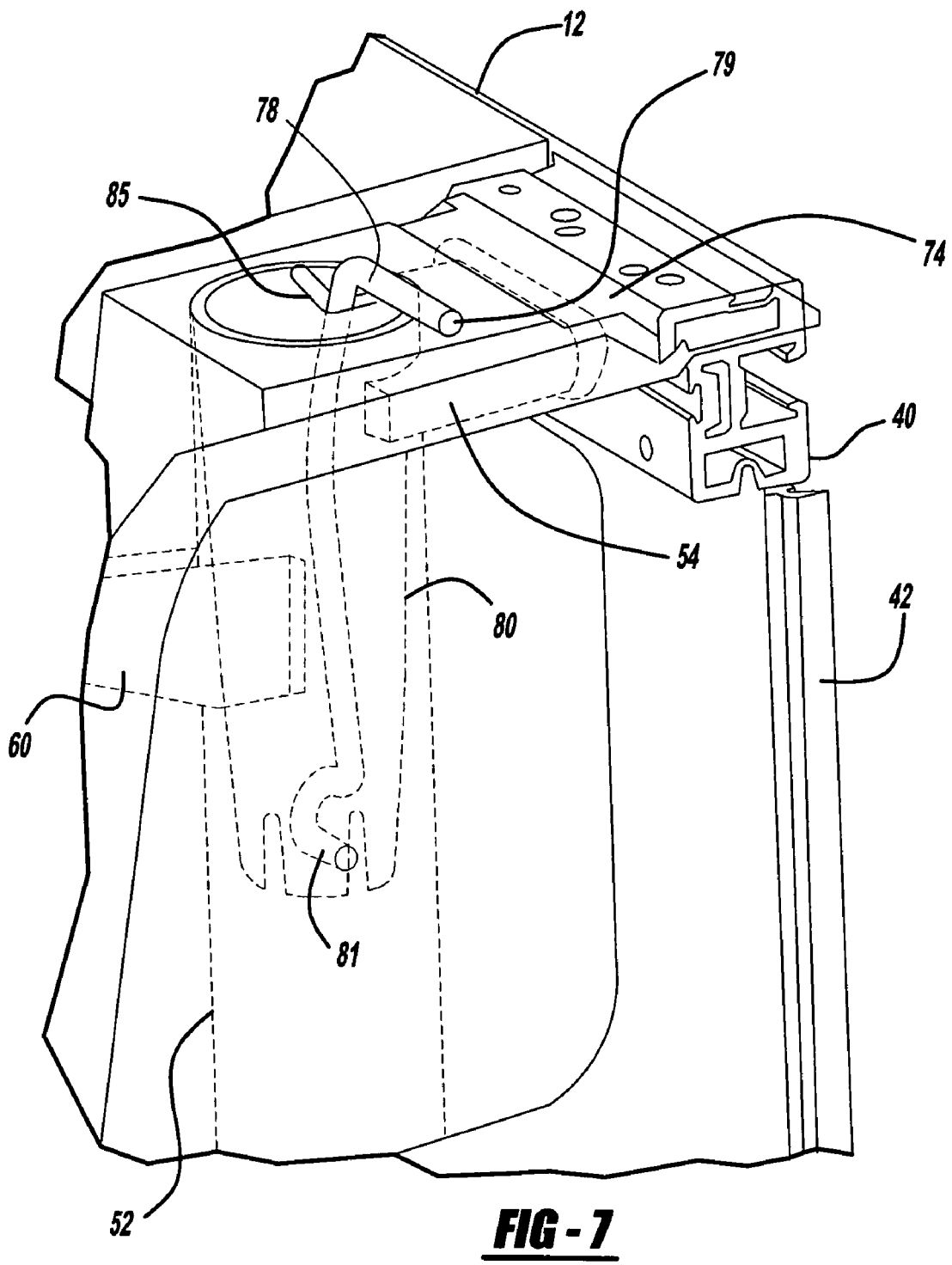
FIG. 7 is a first perspective view of a front extension having a prop rod located in a prop rod sheath used in a vehicle side article transporter device, according to the present invention.
Figure 8:
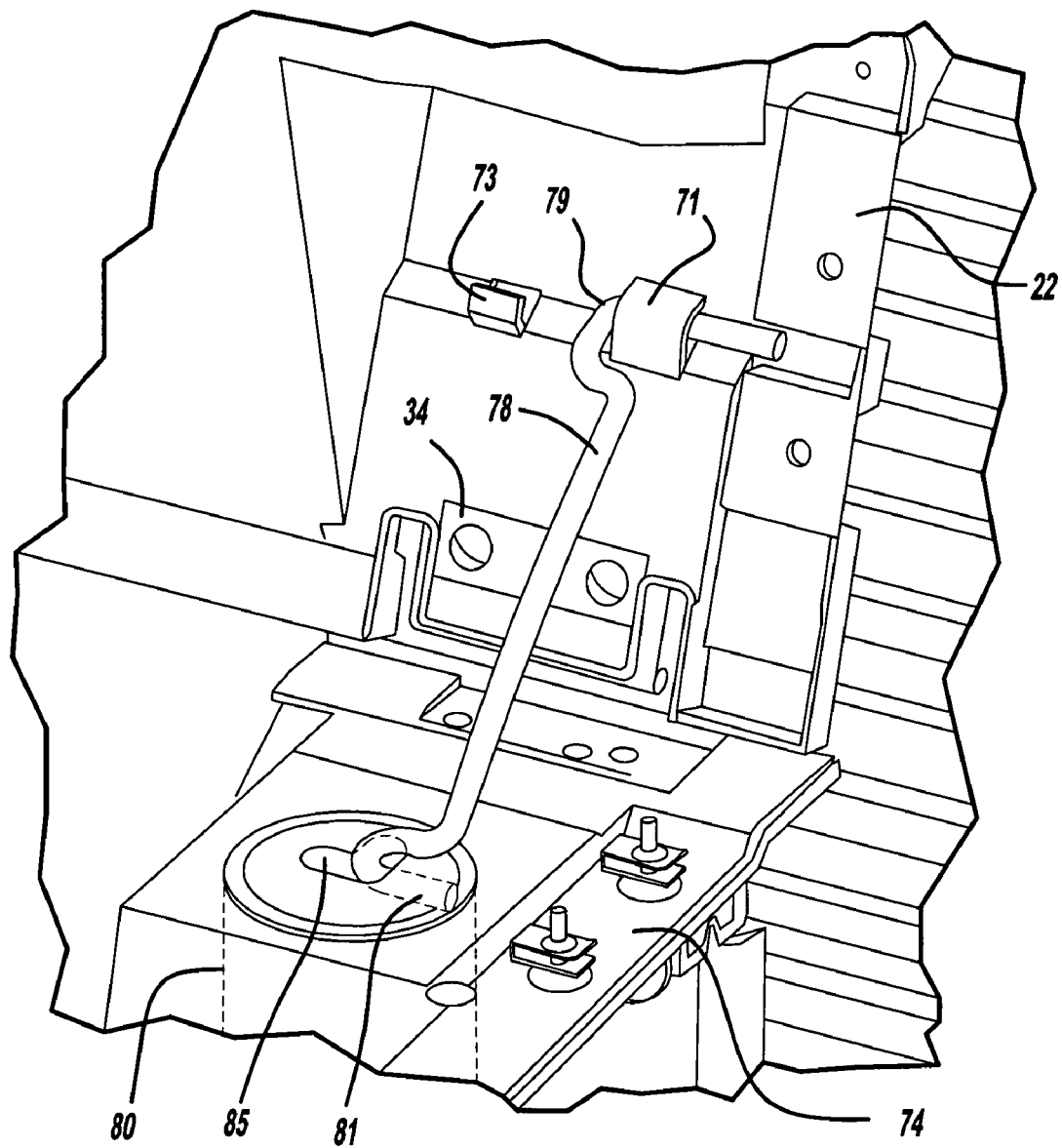
FIG. 8 is a second perspective view of a front extension having a prop rod and a prop rod sheath used in a vehicle side article transporter device, according to the present invention.

Also connected to the container 12 are rear extension 72 and a front extension 74. Both the rear extension 72 and the front extension 74 are connected to the container 12. The front extension 74 includes an aperture 76 which is used for allowing a prop rod 78 to extend through the aperture 76 to support the cover 18 when the cover 18 is open. As best seen in FIGS. 7 and 8, the prop rod 78 is positioned in a tapered prop rod sheath 80; the prop rod sheath 80 is located underneath the front extension 74, and is positioned inside one of the center posts 52.

The prop rod 78 is arcuate in shape, and as the prop rod 78 is forced into the prop rod sheath 80 as the cover 18 is closed, the prop rod sheath 78 will act to partially straighten the prop rod 78, holding the prop rod 78 in one position in the prop rod sheath 80, preventing the prop rod 78 from rattling during vehicle travel. When the cover 18 is opened, the prop rod 78 is pulled out of the prop rod sheath 80 to support the cover 18, best seen in FIG. 8. The prop rod 78 is connected to the door inner 22 through the use of a first arc-shaped bracket 79 which allows the prop rod 78 to rotate about the first arc-shaped bracket 79 when the cover 18 is opened. The first arc-shaped bracket 79 slidably extends through a holder 71, and slides toward a stopper 73 when the cover 18 is to be placed in a closed position. The prop rod 78 also has a second arc-shaped bracket 81 having a reduced diameter portion which is slid into a t-shaped opening 85 on the front extension 74 to hold the cover 18 in an open position when desired.

To operate the prop rod 78, when the cover 18 is opened by the user, the prop rod 78 will be pulled out of the prop rod sheath 80 by the holder 71. Once the cover 18 is to an open position, the user will push the prop rod 78 in a direction away from the stopper 73, and the reduced diameter portion of the second arc-shaped bracket 81 is placed into the t-shaped opening 85. At this point, the prop rod 78 will be in the position shown in FIG. 8. Also, gas or hydraulic struts could be used instead of the prop rod 78 for supporting the cover 18 and for automatically opening and closing the cover 18.

When the cover 18 is in an open position, the container 12 also includes a lamp 82 which can be used for viewing the inside of the container 12 under poor lighting conditions. The lamp 82 is connected to a switch 85; the switch 85 automatically turns on the lamp 82 when the cover 18 is opened. If the cover 18 is to remain open for extended periods of time, the switch 85 can also be used to turn off the lamp 82 to prevent draining the battery of a vehicle when using the lamp 82 is not necessary. Other embodiments include the lamp 82 having a separate rechargeable battery source allowing the lamp 82 to be removable from the container 12. The battery source would be recharged when the lamp 82 is not in use, and provide power to the lamp 82 when the lamp 82 has been removed from the container 12.

To hold the cover 18 in a closed position, the container also includes a set of strikers 84 which are used in combination with door latches 86. The door latches 86 are connected to each other by a cable 88. The cable 88 is connected to a door handle 90 which is used to open the cover 18. Also included in the door handle 90 is a child safety release handle 92. The child safety release handle 92 is able to glow in the dark, and will allow a person to open the cover 18 from inside the container 12 in case of accidental entrapment. To open the cover 18, the handle 92 is actuated, pulling on the cable 88, releasing the door latches 86 from the strikers 84. When the cover 18 is in a closed position, the seal 16 acts to prevent dust and moisture from entering the container 12.

Normally, when the cover 18 moved to a closed position, there is a need for the air to escape to allow the cover 18 to close with greater ease; this is provided by a pressure relief vent (not shown). Because of the seal 16, the pressure relief vent allows the cover 18 to close easier.

The door handle 90 includes a cylinder (not shown) which is "programmable" with the key of the vehicle in which the transporter device 10 is installed. Instead of having a separate key which is used to unlock the door handle 90, the key which is used for the ignition of the automobile can simply be inserted into the cylinder and turned. After turning the key the first time, the cylinder will be programmed to only open with the key to the ignition of that vehicle, making the cover 18 lockable with a single key.

The door latches 86 also provide an alignment feature where the door latches 86 are aligned with the strikers 84, which in turn aligns the cover 18 with the container 12 such that the seal 16 will prevent dust and moisture from entering the container 12. Referring to FIGS. 3-4B, the hinges 34 each have a first piece 87 having holes 89, and a second piece 91 having an elongated cylinder 93. A pin 95 is inserted through the holes 89 of the first piece 87 and the elongated cylinder 93 of the second piece 91, allowing the first piece 87 and the second piece 91 to rotate with respect to once another. The first piece 87 is connected to the container 12 using common fasteners, and the second piece 91 is connected to the door inner 22 in the same manner. However, the door inner 22 also has fitting slots 97; the fitting slots 97 allow the fasteners which connect the second piece 91 to the door inner 22 to change position relative to the second piece 91 of the hinge 34.

During assembly, after the door inner 22, the door outer 20, and the door appliqué 24 are assembled to form the cover 18, and the door latches 86 are connected to the door inner 22, the cover 18 is moved to the closed position such that the door latches 86 are engaged with the strikers 84. Once this occurs, the fasteners used for attaching the second piece 91 are tightened; tightening the fasteners when the door latches 86 are engaged with the strikers 84 ensures that the strikers 84 and door latches 86 are aligned every time the cover 18 is opened and closed, and all respective tolerances are met.

One of the advantages of the present invention is that the transporter device 10 can be incorporated without significantly changing the appearance of a vehicle. The quarter panel 38 typically has a hole 94 which can be used for retaining a device having a hook or handle which is used for tying objects down when being held in place on the flat panel 46 of the structural bed assembly 44. The rear extension 72 also has a hole 96 which is aligned with the hole 94 on the quarter panel 38. The hole 96 of the rear extension 72 is also suited for receiving a quarter cap 98. The quarter cap 98 is used to cover both holes 94 and 96 when the holes 94 and 96 are not in use. Also, the transporter device 10 also allows for the quarter panel 38 to have a typical tail lamp 100.

Figure 9B:
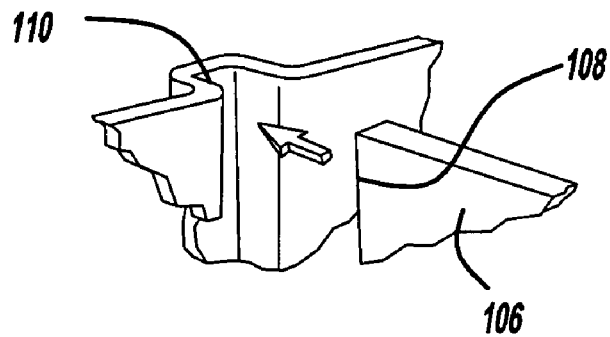
FIG. 9B is an enlarged view of a first embodiment horizontal divider and a pocket inside wall used in a vehicle side article transporter device, according to the present invention.
Figure 9C:
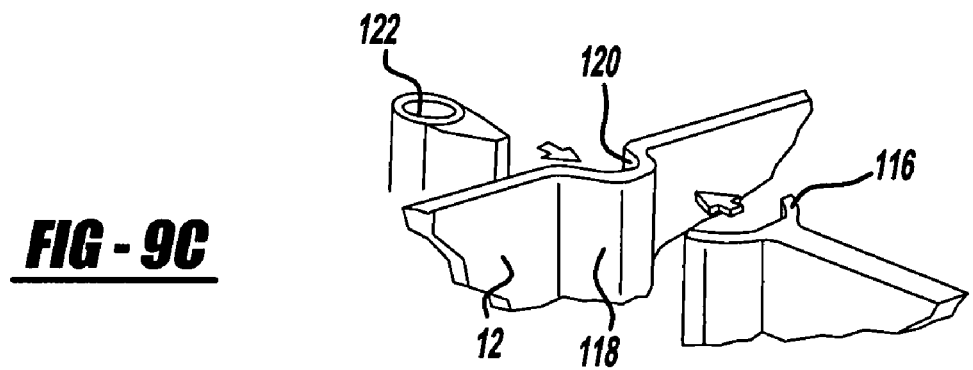
FIG. 9C is an enlarged view of a second embodiment of a horizontal divider and a pocket inside wall used in a vehicle side article transporter device, according to the present invention.

Another particular advantage of the present invention is the container 12 can be divided into sections. Since the container 12 is made through a forming process, the shape of the inside of the container 12 can be changed by simply changing the shape of the container 12 during the forming process. Referring to FIG. 9, the container can be modified to have several different types of dividers. The first type of divider is a horizontal divider 102, which is inserted into the container 12 and is supported by a series of ledges 104 which are formed as part of the container 12. The container 12 can have multiple horizontal dividers 102 at different positions in the container 12. The container 12 can also be manufactured to incorporate cross-car dividers 106. The cross-car dividers 106 can be manufactured in two different ways, the first is to have a cross-car divider 106 with a squared edge 108 which is received by a pocket 110 formed into the container 12, and a projection 112 which is inserted into a corresponding hole 114 which is also formed in the container 12. The pockets 110, along with the projection 112 are inserted into the hole 114, hold the cross-car dividers 106 in place as the container 12 is jolted around from vehicle travel.

The second type of cross-car dividers 106 include an angular recess 116 which align with a first angular pocket 118 formed into the container 12, and a second angular pocket 120 formed into the inner wall 42. The angular pockets 118 and 120 have two functions. The first is to maintain the cross-car divider 106 in position so various items can be stored properly. The second function of the angular pockets 118 and 120 is to allow the flat panel 46 of the structural bed assembly 44 to also be divided. A divider or midgate 122 is commonly used in the beds of pickup trucks to divide the bed into sections when transporting cargo of various sizes. The angular pockets 118 and 120 have the ability to be used with a conventional midgate 122 having a protrusion 124 for holding the midgate 122 along the flat panel 46 in place. It should be noted that the container 12 can also be used with both types of cross-car dividers 106 at the same time, along with using each type of cross-car divider 106 separately.

If the container 12 is being used to transport items which are cooled by ice, such as a beverage, the container 12 also has drain plugs 126 which can be used to drain any excess liquid inside the container 12 when storing cold items. Additionally, the drain plugs 126 can also be used to drain liquid out of the container 12 when the container 12 has been cleaned.

Figure 11:
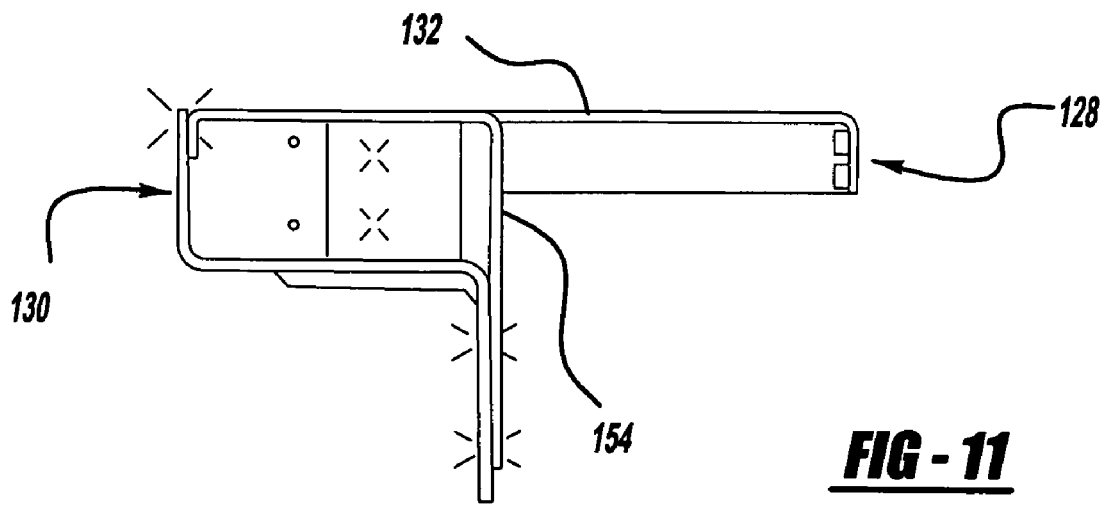
FIG. 11 is a top view of a second embodiment of a corner support used with a vehicle side article transporter device, according to the present invention.
Figure 10:
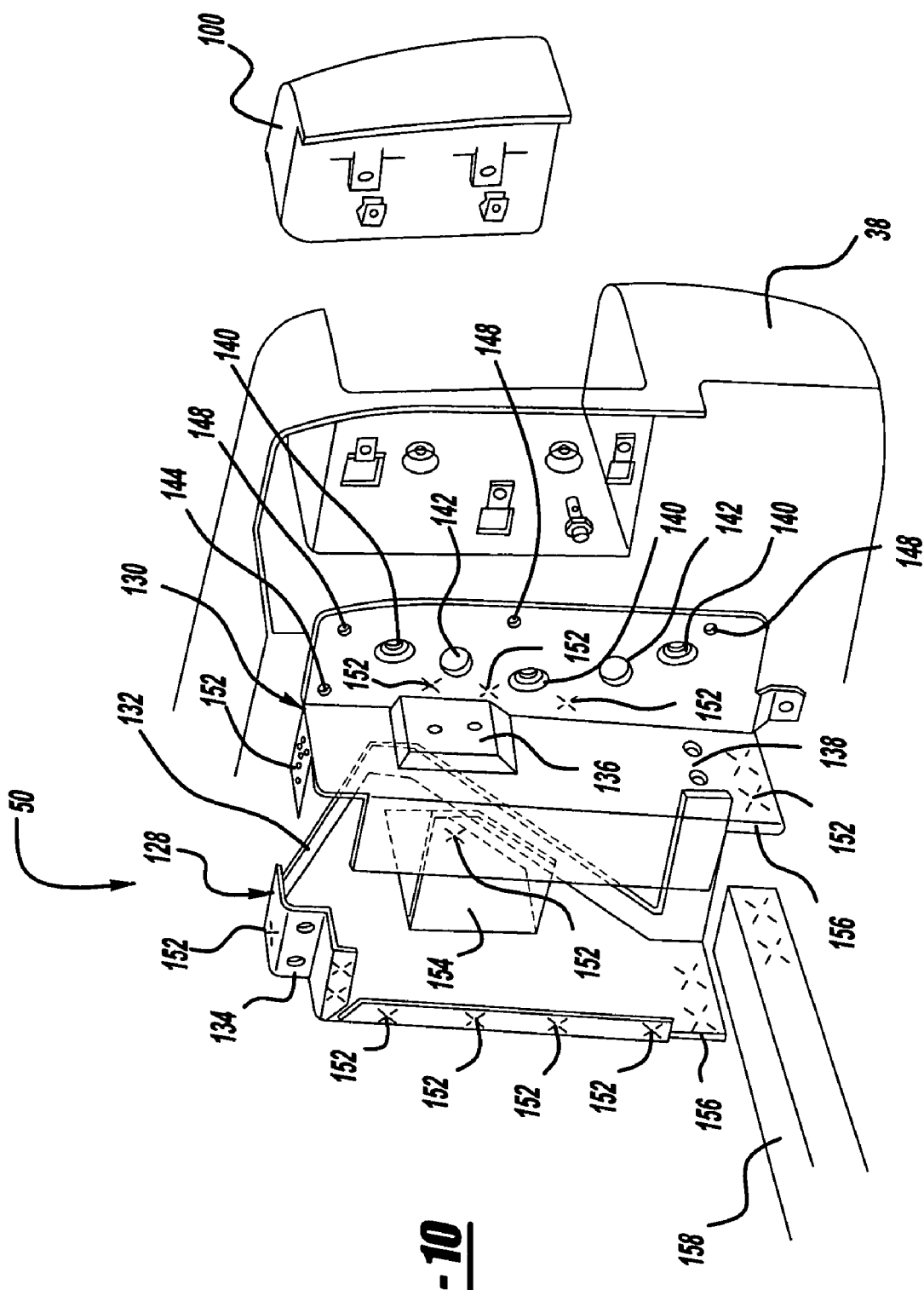
FIG. 10 is a first exploded view of a second embodiment of a second embodiment of a corner support used with a vehicle side article transporter device, according to the present invention.
Figure 12:
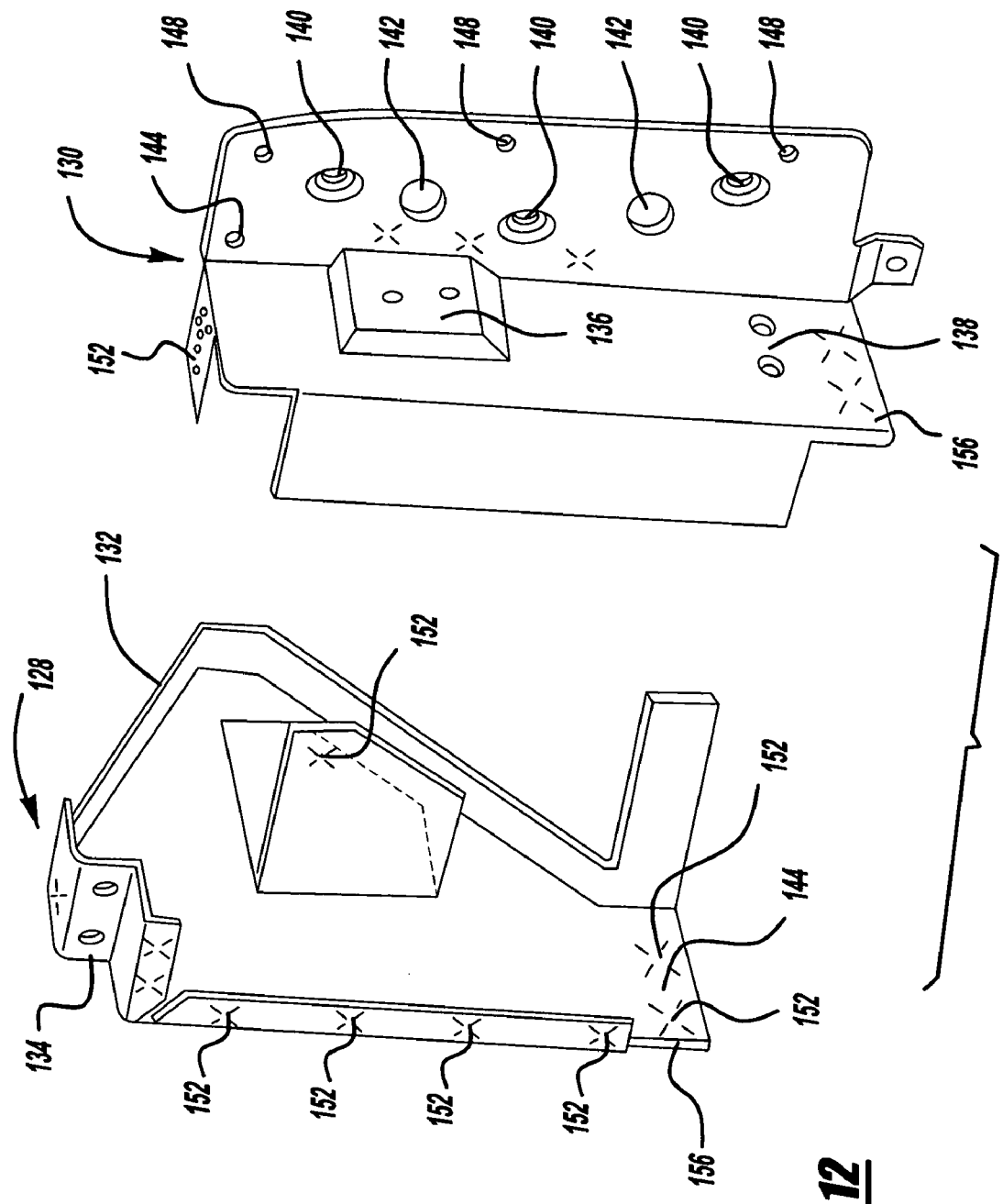
FIG. 12 is a second exploded view of a corner support used with a vehicle side article transporter device, according to the present invention.

An alternate embodiment of the corner support 50 is shown in FIGS. 10-12. Instead of having a center post 52 with the brackets discussed above, the corner support 50 is made up of a first block section 128 and second block 130. The first block section 128 and the second block section 130 are both made of stamped metal, and perform all of the functions of the first embodiment of the corner support 50. The first block section 128 has an angled section 132, and a panel 134 which serves the same function as the first side bracket 54 for supporting the upper rail 40.

The second block section 130 includes a raised bracket 136 which performs the same function as the second side bracket 56, and a lower panel 138 which performs the same function as the third side bracket 58. The second block section 130 also includes a first series of apertures 140 and a second series of apertures 142. The first series of apertures 140 are used to fasten the corner support 50 in FIG. 10 to the quarter panel 38 of a pickup truck or sport utility vehicle. The second series of apertures 142 allow the tail lamp 100 to be assembled onto the quarter panel 38. The second block section 130 also includes a hole 144 for attaching the shocks 146 used for raising the tailgate or the pickup truck or sport utility vehicle. The second block section 130 also has three threaded holes 148, the threaded holes 148 and a common fastener such as a screw (not shown) are used to connect a panel 150, cut from the inner wall 42, to the quarter panel 38. Connecting the panel 150 to the quarter panel 38 in this manner improves the aesthetic appearance of the transporter device 10.

The first block section 128 and the second block section 130 are connected by welding. The first block section 128 and the second block section 130 both have weld points 152 which are used to weld the first block section 128 and the second block section 130 together. Having the corner support 50 formed of the first block section 128 and the second block section 130 reduces the overall number of components and improves the ability of the corner support 50 to meet any tolerance requirements. Additionally, the first block section 128 has a tab 154 which is cut out of the first block section 128 which also as weld points 152 for being welded to the second block section 130. Both of the first block section 128 and the second block section 130 have bottom tabs 156 which have weld points 152. To connect the corner support 50 of the second embodiment to the structural bed assembly 44, the structural bed assembly 44 includes a rear rail 158 which is positioned between, and welded to each of the bottoms tabs 156 of the first block section 128 and the second block section 130.

Figure 13:
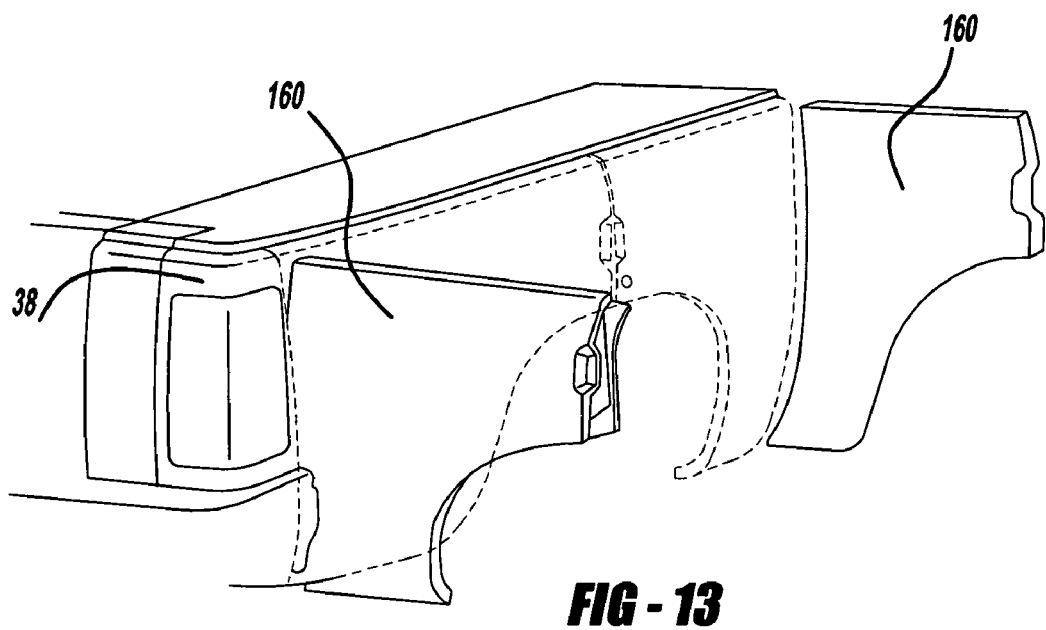
FIG. 13 is a perspective view of two side panels used with an alternate embodiment of a vehicle side article transporter device, according to the present invention.
Figure 14:
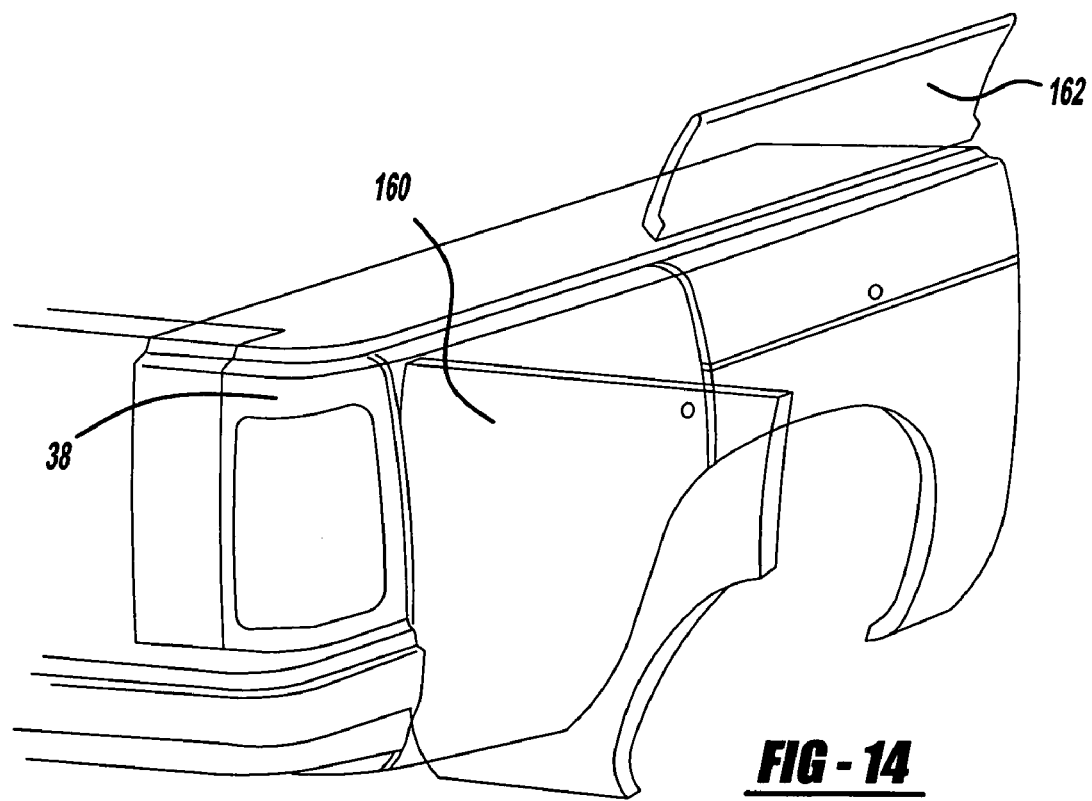
FIG. 14 is a perspective view of a side panel and a half-panel used in another alternate embodiment of a vehicle side article transporter device, according to the present invention.
Figure 15:
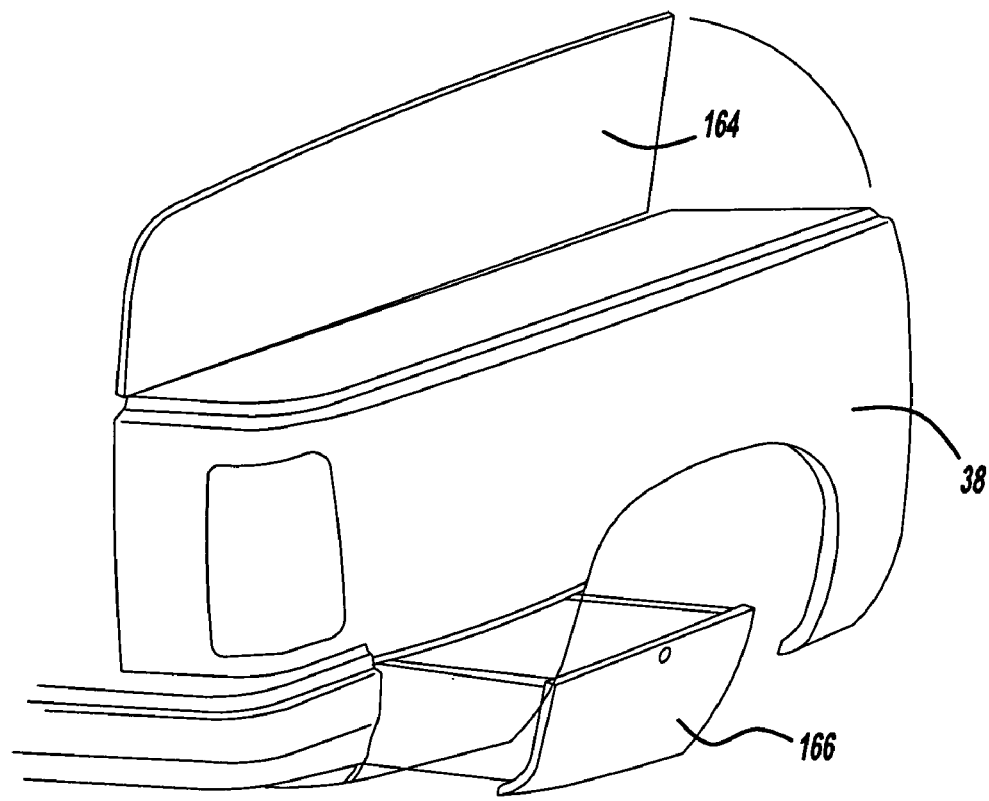
FIG. 15 is a perspective view of a flat cover and a drawer used in yet another embodiment of a vehicle side article transporter device, according to the present invention.
Figure 16:
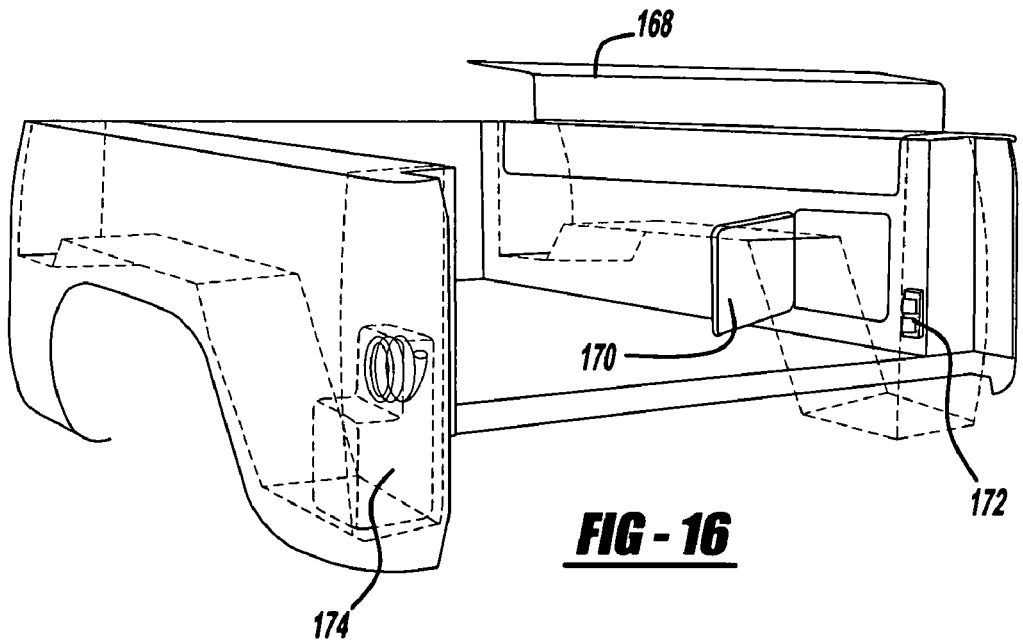
FIG. 16 is a perspective view of an inner cover, a power outlet and a compressor used in yet another embodiment of a vehicle side article transporter device, according to the present invention.

In addition to having the ability to be divided into different sections, the container 12 also has the ability to allow for different types of access as alternate embodiments to the cover 18. Referring to FIG. 13, the cover 18 and quarter panel 38 have been replaced with side panels 160 (with the side panels 160 being shown in a closed position in phantom) which open to allow access to the container 12 in a different manner than described above. Various combinations of doors and panels can also be used to access the container 12. For instance, in FIG. 14, the cover 18 and the quarter panel 38 can be replaced with a side panel 160 and a half-panel 162. In FIG. 15, the cover 18 and the quarter panel 38 are replaced with a flat cover 164 and a drawer 166. In FIG. 16, the container 12 also can have an inner cover 168 which opens from the same side of the container 12 as the structural bed assembly 44, and having a small door 170. The small door 170 can be used for accessing the inside of the container 12, or if the container 12 has been equipped with a power outlet 172, and an air compressor 174, the small door 170 can be used for accessing the power outlet 172 and the air compressor 174. An electronic cooler (not shown) could also be used in the container 12, where the electronic cooler would plug in to the power outlet 172 and allow items to be stored at a reduced temperature inside the cooler.

It is not necessary to change the cover 18 or the quarter panel 38 for the container 12 to include the power outlet 172 and the air compressor 174, the container 12 can include these items, as well as a battery charger unit 176 and a power inverter 178, as shown in FIG. 16.

Power supplied to the container 12 could be used with other types of electronic devices as well. Audio speakers, video monitors, internet connections, phones, docking ports, and additional power outlets could also be used and stored in the container 12. The container 12 could also be completely dedicated to providing an entertainment package having a video monitor which could be used for video games, playing DVD's, or with satellite television.

It should be noted that the power inverter 178 is necessary to provide power to the power outlet 172 for use with the various aforementioned items.

Figure 17:
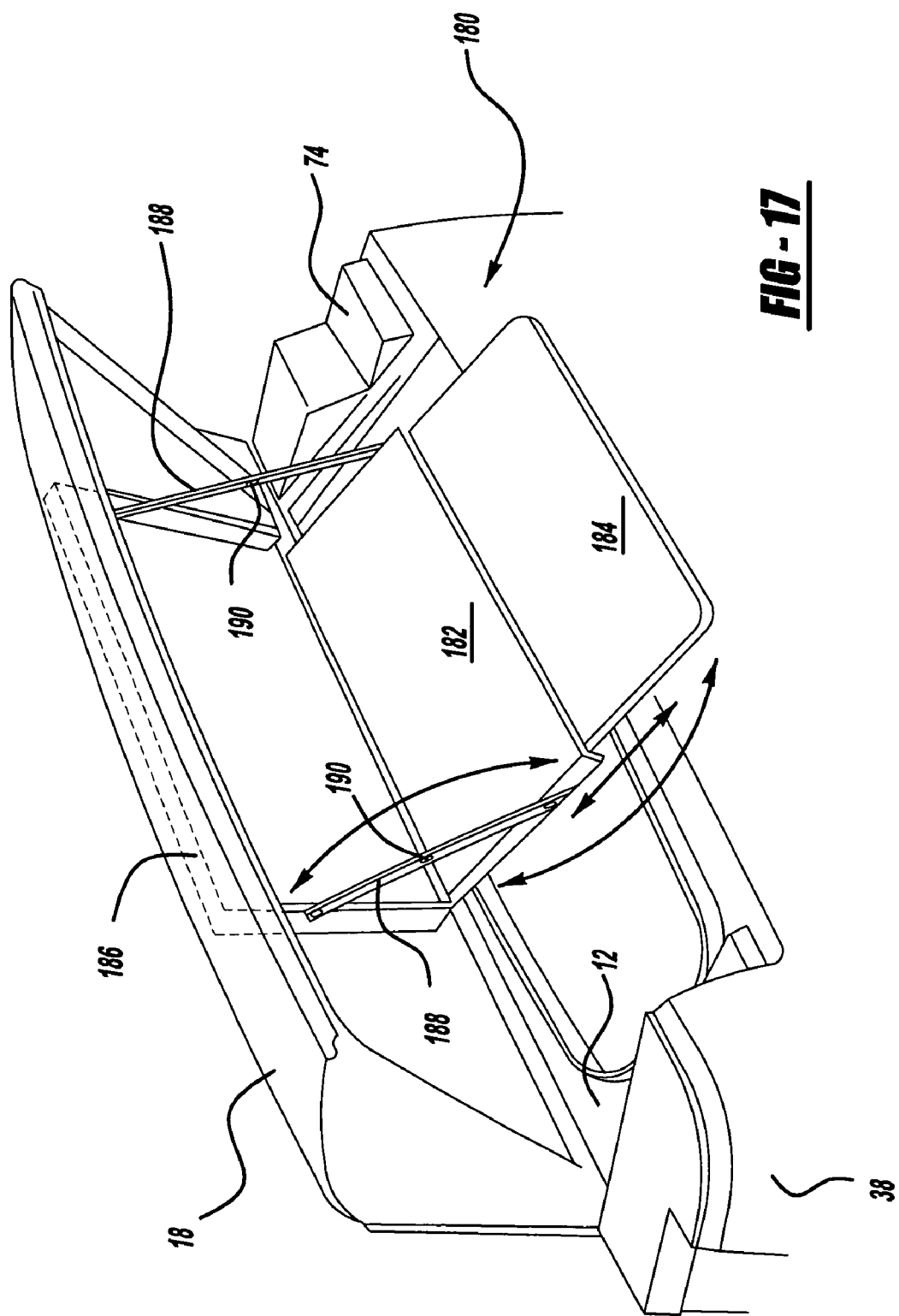
FIG. 17 is a perspective view of a cover having a drop-down extendable workboard used in a vehicle side article transporter device, according to the present invention.
Figure 18:
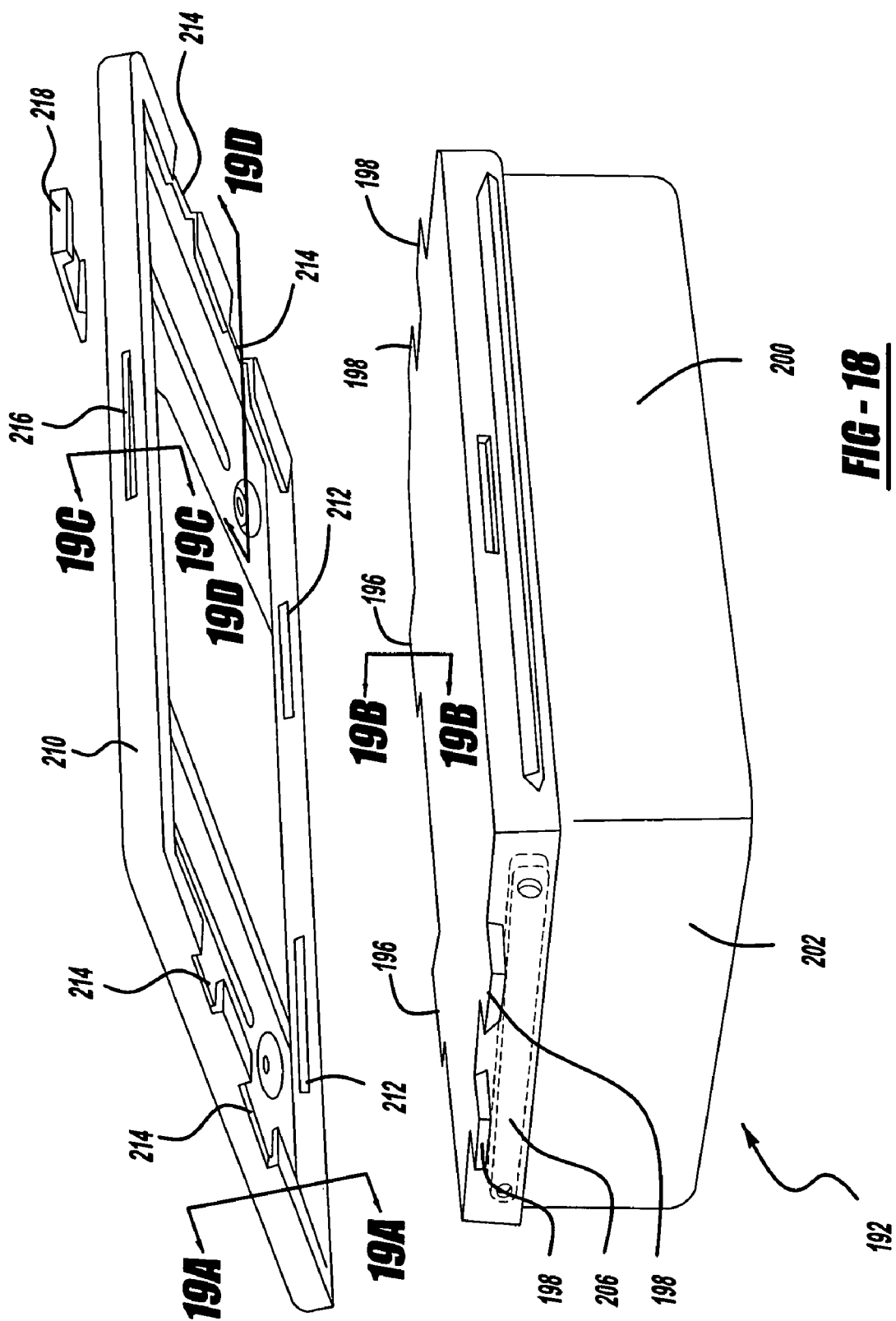
FIG. 18 is a perspective view of a storage module used with the cover of a vehicle side article transporter device, according to the present invention.
Figure 19A:
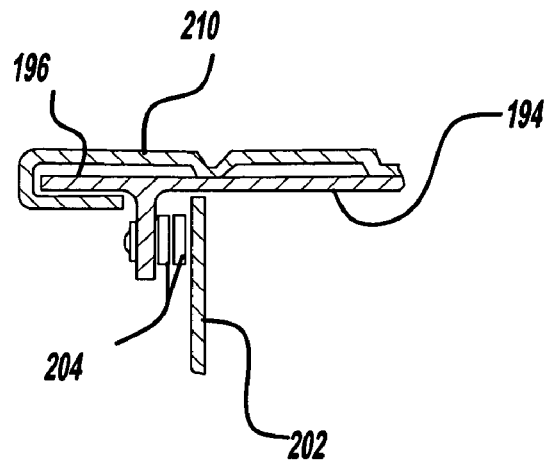
FIG. 19A is a sectional side view taken along line A-A of FIG. 18.
Figure 19B:
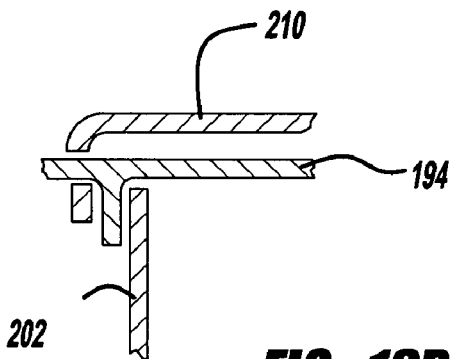
FIG. 19B is a sectional side view taken along line B-B of FIG. 18.
Figure 19C:
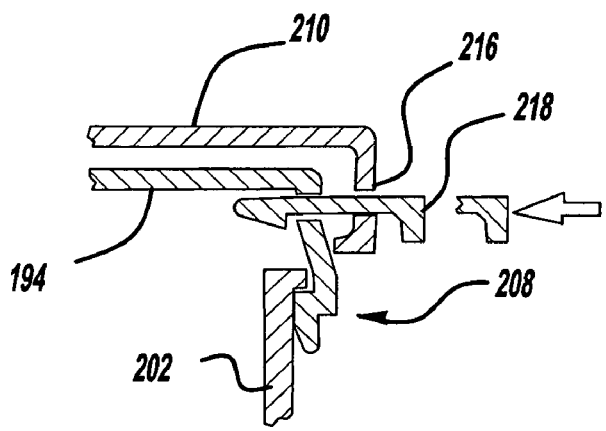
FIG. 19C is a sectional side view taken along line C-C of FIG. 18.
Figure 19D:
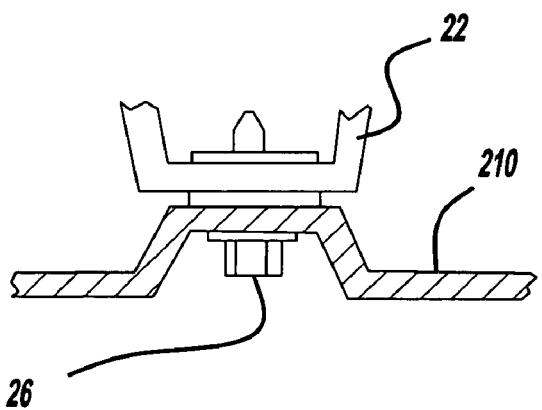
FIG. 19D is a sectional side view taken along line D-D of FIG. 18.

The container 12 and the cover 18 can include other types of features as well. Referring now to FIG. 17, incorporated into the cover 18 is a drop-down extendable work board 180. The work board 180 is made of a first panel 182 and a second panel 184. The second panel 184 is stored underneath the first panel 182, and slides outward away from the first panel 182 as shown in FIG. 17. The second panel 184 has extensions (not shown) which only allow the second panel 184 to extend to a maximum position, shown in FIG. 17. The work board 180 is stored in a cavity 186 when not in use. Connected to the cavity 186 and the first panel 182 are two foldable brackets 188. The foldable brackets 188 fold at the hinge points 190 which allows the work board 180 to be stored in the cavity 186. The work board 180 could also be used as a drawing pad, or used with a keyboard and mouse if the transporter device 10 is used with a computer.

The work board 180 could be replaced with a stowable cook top (not shown). The cook top is plugged into the power outlet 172, and would be folded down for use in activities such as tailgating or camping.

Another feature of the container 12 is the use of a storage module 192. A first embodiment of the storage module 192 is shown in FIGS. 18A-18F. The storage module 192 has a lid 194 having a set of rear tabs 196, a set of side tabs 198, and a front slot 200. The storage module 192 also includes a bin 202 which is connected to the lid 194 through a set of rear hinges 204 and a side hinge 206. The storage module 192 also includes a snap connection 208 which holds the storage module 192 in a closed position when being stored. In this embodiment, the storage module 192 also includes a mounting plate 210 which is fastened to the door inner 22 with the attaching screw 26. The mounting plate 210 includes a set of rear slots 212, open side slots 214 on each side of the mounting plate 210, and a front slot 216.

When the storage module 192 is to be stored in the container 12 when not in use, the rear tabs 196 are inserted into the corresponding rear slots 212, and the side tabs 198 will align and fit into the corresponding open side slots 214 on the mounting plate 210. Once in this position, a locking key 218 is inserted through the front slot 216 of the mounting plate 210, and the front slot 200 of the lid 194. The locking key 218 has an angled tab 220, which holds the locking key 218 in place, thereby maintaining the position of the rear tabs 196 in the rear slots 212, and the side tabs 194 in the side slots 214. This affixes the storage module 192 to the mounting plate 210 when the storage module 192 is not being used.

Figure 20A:
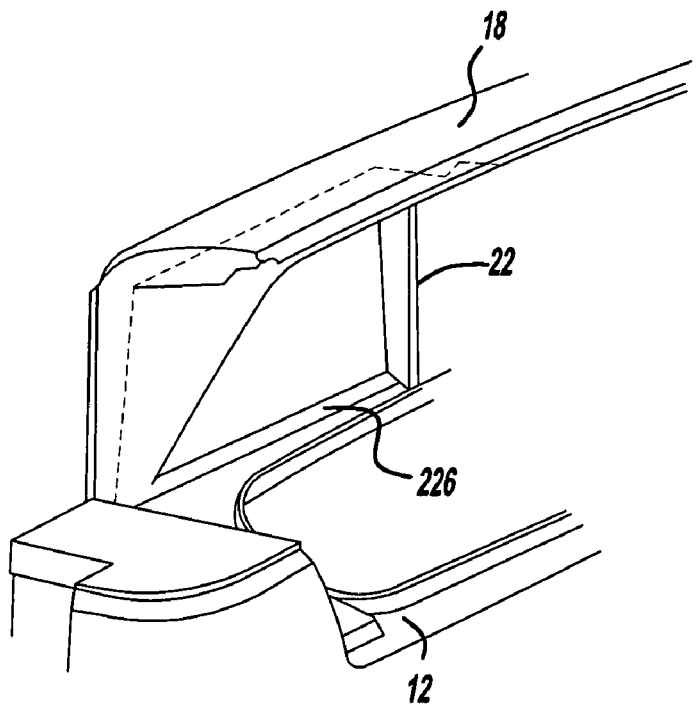
FIG. 20 is a perspective view of a second embodiment of a storage module used with a vehicle side article transporter device, according to the present invention.
Figure 20B:
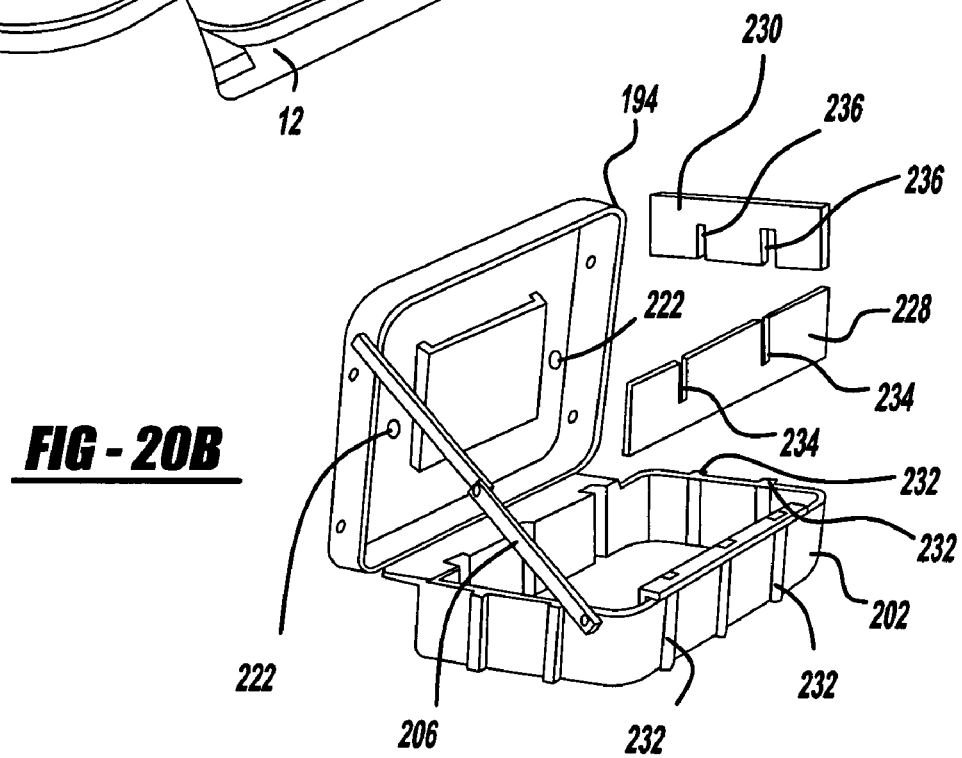
Figure 20C:
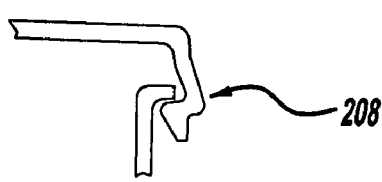

A second embodiment of the storage module 192 is shown in FIG. 20, wherein like numbers refer to like elements. In this embodiment, the mounting plate 210 has been removed, and the lid 194 is connected directly to the door inner 22 through the attaching screws 26 which are inserted through bolt holes 222. In this embodiment, the storage module 192 is permanently connected to the door inner 22, and the bin 202 is connected to the lid 184 in the with the same snap connection 208, and side hinge 206 as described in the previous embodiment. However, also included is a rear mounting plate 224 which rests on a ledge 226 incorporated into the door inner 18. The rear mounting plate 224 is connected to the lid 194 by the same rear hinges 204 described in the previous embodiment, which are not shown in the FIG. 20, and the same side hinges 206. When the storage module 192 is to be accessed, the cover 18 of the container 12 is opened, and the snap connection 208 is released, allowing the bin 202 to fold outward to be accessed.

The both of the embodiments of the storage module 192 also include the use of a first divider 228, and a second divider 230. The bin 202 includes a series of recesses 232 which holds the first divider 228 and the second divider 230 in place. Also, the first divider 228 includes a pair of slots 234 which are half the width of the first divider 228. The second divider 230 also includes a pair of slots 236, which are also half the width of the second divider 230. The first divider 228 is inserted into a pair of the recesses 232, and the second divider 230 is also inserted into a pair of recesses 232 such that one of the slots 234 on the first divider 228 aligns with one of the slots 236 on the second divider 230. This configuration allows the first divider 228 and the second divider 230 to divide the bin 202 into sections, allowing the bin 202 to store smaller items, and preventing smaller items from being shifted around during transport. The position of the first divider 228 and second divider 214 can be changed to allow different size items to be stored in the bin 190.

Other items may be used with the present invention, and could be stored directly in the storage module 192, or in the container 12, which include tool kits, a sportsman's rack for fishing tackle or firearm accessories and ammunition, medical kit storage, a vehicle safety kit having items such as flares or reflective triangles, a camping utensil kit having items such as a hatchet, knife, flashlight, or rope, or a cooking utensil kit having items such as a knife, fork, spoon, tongs, or spatula. Also included could be a rack having a series of fasteners for storing different items.

Figure 21:
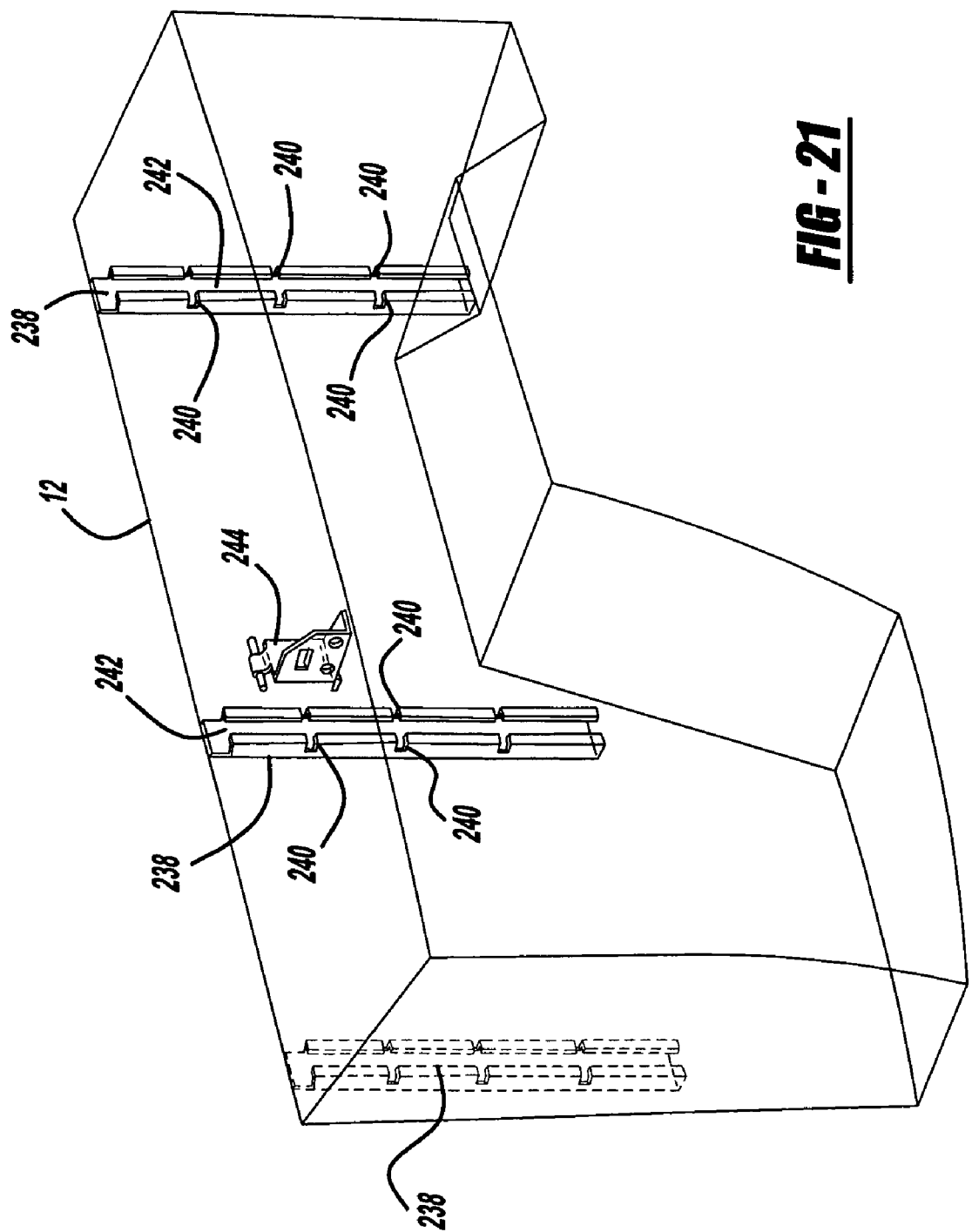
FIG. 21 is a perspective view of a container having racks for supporting a flip-down board, according to the present invention.
Figure 22:
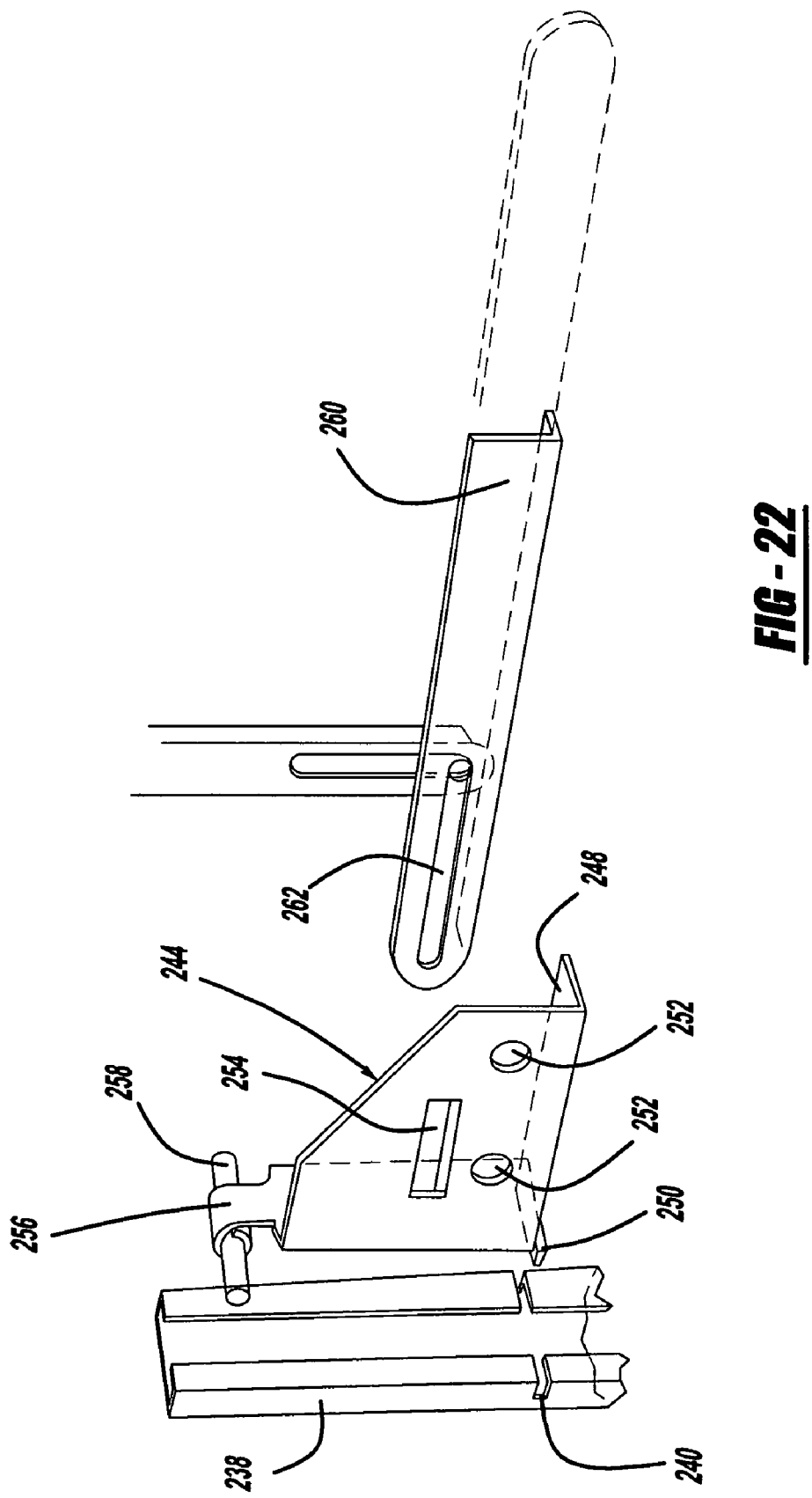
FIG. 22 is an enlarged perspective view of a hinge and a two piece bracket used with the rack shown in FIG. 21, according to the present invention.
Figure 23:
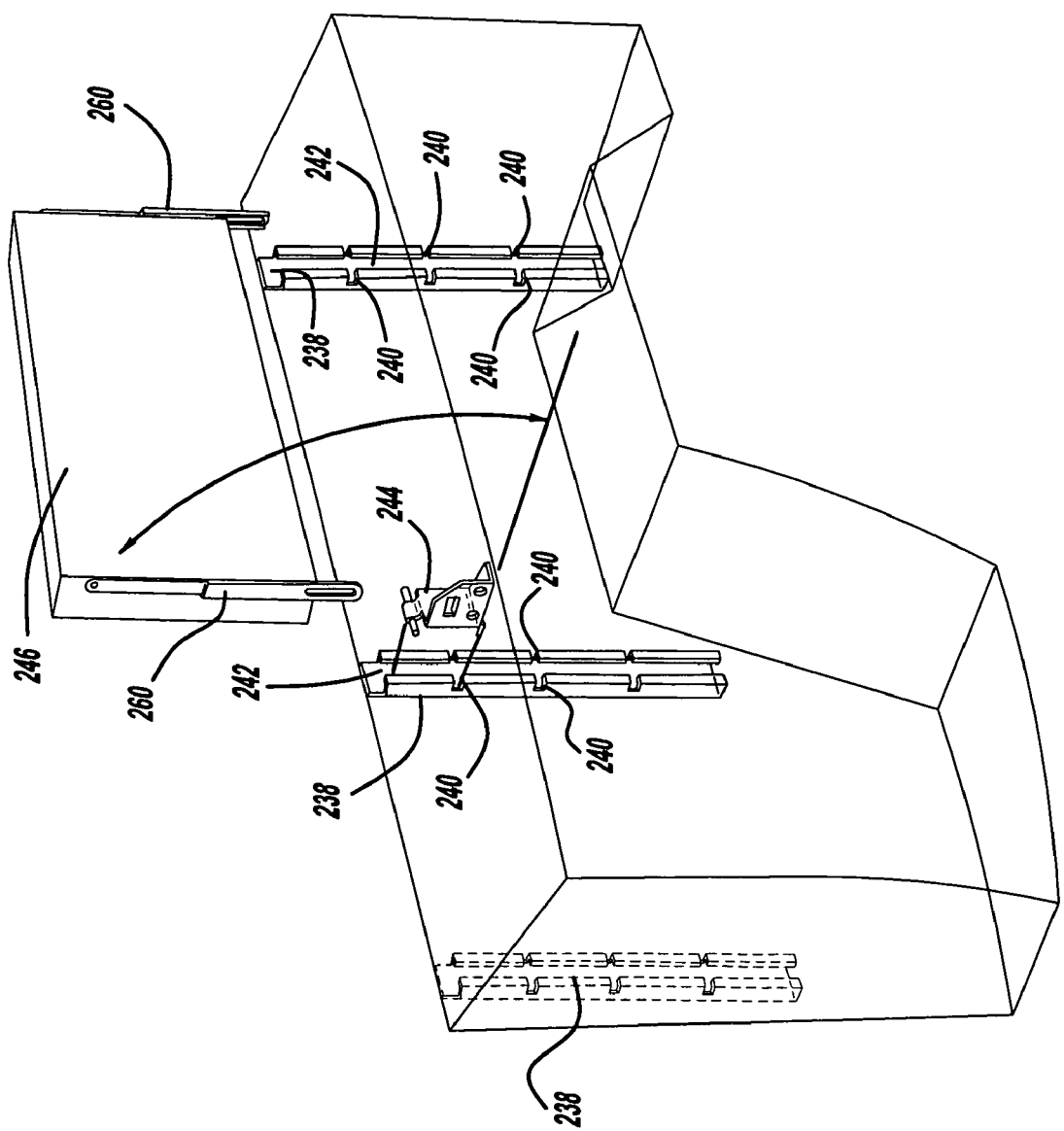
FIG. 23 is an exploded perspective view of a container having racks and a flip-down board, according to the present invention.

Another application of the present invention is shown in FIG. 21. The container 12 is equipped with two racks 238 having a series of notches 240 and a channel 242. Each rack 238 is used with a removable hinge 244; each removable hinge 244 is used for supporting a flip-down board 246. The hinge 244 has a flat portion 248 and an extension 250. The hinge 244 also includes two holes 252, a tab 254, and a curved flange 256. The curved flange 256 surrounds, and is connected to, a pin 258. Referring to FIG. 23, the flip-down board 256 includes a telescoping two-piece bracket 260 for supporting each side of the board 256. In this embodiment, the hole 252 closest to the rack 238 is not in use. A fastener (not shown) connects the hole 252 furthest away from the extension 250 to a slot 262 formed in the bracket 260. To use the board 246, the board is rotated about the fastener in the slot 262 from the position shown in FIG. 23, to the position shown in FIG. 22. The board 246 is then slid on the flat portion 248 until the board rests underneath the tab 254. Once the board 246 is underneath the tab 254, the board 246 will no longer be able to rotate, and can be used to support any number of items.

The hinge 244 can also be adjusted to various heights along the racks 238. When a hinge 244 is mounted on one of the racks 238, the pin 258 is inserted into a pair of the notches 240, and the extension 250 will be inserted into the pair notches 240 below the notches 240 in which the pin 258 is inserted. The distance between the pin 258 and the extension 250 is the same distance between the sets of notches 240 along the rack 238. The pin 258 and the extension 250 can be inserted into different sets of notches 240 to adjust the height of the board 246 when in use. Also, the racks 238 can be changed to change the position of the board 246 as well. An example of where one of the racks 238 can be moved to is shown in FIGS. 21 and 23.

Figure 24:
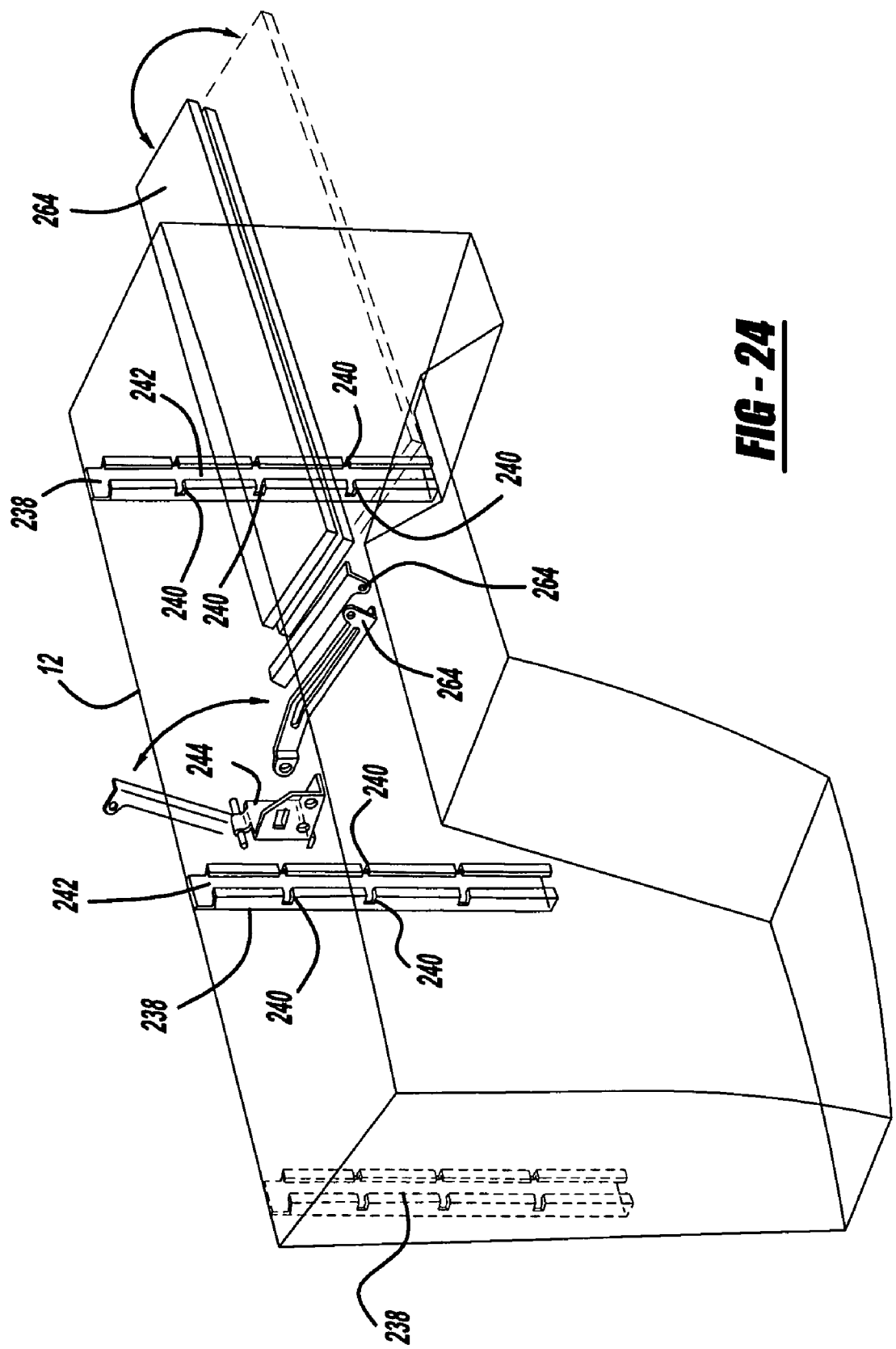
FIG. 24 is an exploded perspective view of a container having rack for supporting an alternate embodiment of a flip-down board, according to the present invention.

An alternate embodiment of the board 246 is shown in FIG. 24, with the board 246 being divided into two pieces. In this embodiment, the board 246 is supported on two sides by a two-piece foldable bracket 264. The bracket 264 is connected to the hole 252 closest to the extension 250. The bracket 264 also includes a stepped portion 266 which allows the bracket 264 and the board 246 to pivot about the stepped portion 256 without contacting the tab 254. The stepped portion 256 is connected to the hinge 244 through the use of a fastener (not shown) which will allow the bracket 264 to pivot about the stepped portion 256. This embodiment also includes a rack 238 for supporting the hinge 244, similar to the first embodiment.

An example of the present invention incorporated into a pick-up truck is shown in FIG. 25, and a sport-utility vehicle in FIG. 26. In can be seen that the door appliqué 24 is shaped differently, depending upon the type of vehicle in which the present invention is used.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle side article transport device comprising:
    an inner upper rail;
    an outer rail;
    a container having at least one opening, said container being integrally formed with and supported by said outer rail and said inner upper rail;
    an inner wall operably associated with said container, said inner wall providing support for said inner upper rail;
    a cover having a door inner, a door outer, and a door appliqué;
    a seal operably associated with said container and said cover;
    a structural bed assembly having at least one corner support, said at least one corner support providing support for said outer rail, and being connected to and supporting said inner wall;
    a prop rod located in a prop rod sheath, said prop rod operably associated with said cover;

a lamp located inside said container for providing light in low-lighting conditions; and wherein said cover can be placed in an open position or a closed position, said prop rod holds said cover in an open position, and said seal will provide an air-tight enclosure between said cover and said opening of said container.

2. The vehicle side article transport device according to claim 1, wherein said quarter panel is further comprised of one of the group comprising at least one side panel, a half-panel, a door, a drawer, or combination thereof.

3. The vehicle side article transport device according to claim 1, wherein said cover is further comprised of a flat cover, and said flat cover allowing access to said container.

* * * * *